United States Patent
Hatanaka et al.

(10) Patent No.: US 6,933,259 B2
(45) Date of Patent: Aug. 23, 2005

(54) COMPOSITE OXIDE POWDER, A METHOD FOR PRODUCING THE SAME AND A CATALYST USING THE SAME

(75) Inventors: Miho Hatanaka, Aichi-gun (JP); Akira Morikawa, Aichi-gun (JP); Akihiko Suda, Aichi-gun (JP); Hideo Sobukawa, Aichi-gun (JP); Kiyoshi Yamazaki, Aichi-gun (JP)

(73) Assignee: Kabushiki Kaisha Toyota Chuo Kenkyusho, Aichi-gun (JP)

(*) Notice: Subject to any disclaimer, the term of this patent is extended or adjusted under 35 U.S.C. 154(b) by 249 days.

(21) Appl. No.: 09/987,262

(22) Filed: Nov. 14, 2001

(65) Prior Publication Data

US 2002/0090512 A1 Jul. 11, 2002

(30) Foreign Application Priority Data

Nov. 15, 2000 (JP) .......................... 2000-347952
Nov. 1, 2001 (JP) .......................... 2001-336643

(51) Int. Cl.$^7$ .......................... C01F 17/00; B01J 21/02; B01J 21/06; B01J 23/10; B01J 23/03

(52) U.S. Cl. .................. 502/240; 423/263; 423/326; 423/327.1; 423/331; 423/593.1; 423/598; 423/600; 423/594.12; 423/594.16; 502/242; 502/261; 502/262; 502/263; 502/300; 502/302; 502/303; 502/304; 502/340; 502/341; 502/349; 502/350; 502/351

(58) Field of Search .................. 502/242, 250, 502/262, 263, 302, 303, 328, 332, 350, 304, 240, 261; 423/598, 600, 263

(56) References Cited

U.S. PATENT DOCUMENTS 5,397,758 A    3/1995  Bouruetaubertot et al.
5,993,762 A    11/1999 Rajaram et al.
6,150,288 A *  11/2000 Suzuki et al. ............ 501/105
6,306,794 B1 * 10/2001 Suzuki et al. ............ 502/304
6,335,305 B1   1/2002  Suzuki et al.
6,391,276 B1   5/2002  Suda et al.
6,528,029 B1 * 3/2003  Dettling et al. .......... 423/210
6,528,451 B2 * 3/2003  Brezny et al. ............ 502/304
6,534,438 B1 * 3/2003  Baker et al. ............. 502/325
6,605,565 B1 * 8/2003  Zhang et al. ............. 508/304

FOREIGN PATENT DOCUMENTS

| EP | 0 834 348 | 4/1998 |
|----|-----------|--------|
| EP | 1 020 216 | 7/2000 |
| EP | 1 040 870 | 10/2000 |
| EP | 1 175 935 | 1/2002 |
| FR | 2 804 102 | 7/2001 |
| JP | 60-248236 | 12/1985 |
| JP | 61-4532   | 1/1986 |
| JP | 62-91244  | 4/1987 |

* cited by examiner

*Primary Examiner*—Wayne A. Langel
(74) *Attorney, Agent, or Firm*—Oblon, Spivak, McClelland, Maier & Neustadt, P.C.

(57) ABSTRACT

This composite oxide powder can secure a large pore volume even after calcination at high temperature and, when a catalyst is formed by loading a noble metal on this composite oxide powder, noble metal grain growth can be suppressed. The composite oxide powder comprises particles of an oxide of a metal $M_1$ and an oxide of a metal $M_2$ which does not dissolve in the oxide of the metal $M_1$, the oxide of the metal $M_1$ and the oxide of the metal $M_2$ being dispersed at the nanometer level. Since different oxides serve as a barrier to each other, sintering is suppressed. Therefore, in the case of composite oxide powder comprising Ce as a metal $M_1$ and Al as a metal $M_2$, grain growth is small even after exposed to high temperature and pores of 3.5–100 nm secure a volume of 0.07 cc/g or more after calcination at 600° C. for 5 hours and a volume of 0.04 cc/g or more after calcination at 800° C. for 5 hours.

21 Claims, 9 Drawing Sheets

COMPOSITE OXIDE POWDER, A METHOD FOR PRODUCING THE SAME AND A CATALYST USING THE SAME

BACKGROUND OF THE INVENTION

1. Field of the Invention

This invention relates to composite oxide powders useful as a catalyst support, a method of producing the same and a catalyst using this composite oxide powder as a catalyst support. This catalyst can be utilized for the purposes of hydrogen generation, exhaust gases purification, and so on.

2. Description of the Related Art

As catalysts for purifying automotive exhaust gases, there have been employed 3-way catalysts so far which oxidize carbon monoxide (CO) and hydrocarbons (HC) and reduce nitrogen oxides ($NO_x$) at the same time to purify exhaust gases. For example, 3-way catalysts are known widely which comprise a heat-resistant honeycomb-shaped supporting base material formed of cordierite, and a catalyst support layer formed of $\gamma$—$Al_2O_3$ and disposed on the supporting base material, and a noble metal such as platinum (Pt) and rhodium (Rh) loaded on the catalyst support layer.

Catalyst supports used for catalysts for purifying exhaust gases are required to have a large specific surface area and a high heat resistance, and are generally composed of $Al_2O_3$, $SiO_2$, $ZrO_2$, $TiO_2$ or the like. In order to reduce variations in exhaust gases atmospheres, it is also known to add $CeO_2$, which has oxygen storage ability, or a $CeO_2$—$ZrO_2$ solid solution, which has improved oxygen storage ability and heat resistance to $CeO_2$.

By the way, owing to the recent severe regulations on exhaust gases, there is an extremely strong need to purify exhaust gases even in a very short time from an engine start. To meet these regulations, it is necessary to activate a catalyst to purify regulated exhaust gases components at lower temperatures. Particularly, a catalyst comprising $CeO_2$ and Pt, etc., loaded thereon has a superior ability of converting CO from a low temperature. By using this type of catalysts in combination with the above 3-way catalysts, CO is ignited at low temperature and CO adsorption poisoning is lessened and HC ignitability improves. Also by igniting CO at low temperature, warming of catalyst surfaces is promoted, whereby HC can be converted from a low temperature range. Besides, when this type of catalysts are employed, $H_2$ is generated in a low temperature range by water gas shift reaction and the generated $H_2$ can be used as a reducing agent for a reaction with $NO_x$, whereby $NO_x$ can be reduced and purified from a low temperature range.

However, the conventional catalyst comprising $CeO_2$ and Pt or the like loaded on $CeO_2$ is poor in durability in actual exhaust gases because $CeO_2$ is sintered by heat, and cannot be in practical use. In order to use this conventional catalyst in actual exhaust gases, there is need to improve its heat resistance without damaging oxygen storage and release capability of $CeO_2$. If the heat resistance is not improved without damaging the oxygen storage capability of $CeO_2$, there is a fear that noble metal grains grow and the noble metal catalytic activity declines. Therefore, when $CeO_2$ is employed as a catalyst support, it is essential to stabilize a noble metal on the catalyst support.

SUMMARY OF THE INVENTION

The present invention has been conceived in view of these circumstances. It is an object of the present invention to provide composite oxide powder having a large specific surface area and a large pore volume even after exposed to high temperature for a long time, without losing characteristics of an oxide of a single metal. It is another object of the present invention to provide a catalyst with excellent durability by suppressing noble metal grain growth during the use at high temperature for a long time.

Composite oxide powder according to one aspect of the present invention, which dissolves the aforementioned problems, is characterized by comprising particles of a composite oxide of an oxide of a metal $M_1$ and an oxide of a metal $M_2$ which does not dissolve in the oxide of the metal $M_1$, the oxide of the metal $M_1$ and the oxide of the metal $M_2$ being dispersed at the nanometer level.

This composite oxide powder can be put in a more concrete expression as follows: When analysis on micro areas of one of the composite oxide particles not overlapped is carried out by means of energy dispersive X-ray spectroscopy (EDS) using a field emission scanning transmission electron microscope (FE-STEM) with a beam of 5-nm diameter, the metal $M_1$ and the metal $M_2$ are detected at composition in ±20% of charge composition at 90% or more of respective analytical points. It is more preferable that when analysis on micro areas of one of the composite oxide particles not overlapped is carried out by means of EDS using a FE-STEM with a beam of 0.5-nm diameter, the metal $M_1$ and the metal $M_2$ are detected at composition in ±20% of charge composition at 90% or more of respective analytical points.

Composite oxide powder according to another aspect of the present invention is characterized by comprising:

composite oxide particles comprising an oxide of a metal $M_1$, and an oxide of a metal $M_2$ which does not dissolve in the oxide of the metal $M_1$, the oxide of the metal $M_1$ and the oxide of the metal $M_2$ being dispersed at the nanometer level; and particles of the oxide of the metal $M_2$;

a mixture in which the composite oxide particles and the particles of the oxide of the metal $M_2$ are dispersed at the level of not more than 50 nm being contained by 90% or more of the total weight of the composite oxide powder.

In the composite oxide powder of the present invention, it is preferable that the metal $M_1$ is Ce, the metal $M_2$ is at least one element of Al, Ti and Si, and more preferable that the metal $M_2$ is Al. The oxide of the metal $M_1$ is contained preferably in an amount of 50 % or more, and more preferably in an amount of 75 % or more of the total weight of the composite oxide powder.

The composite oxide powder of the present invention can further comprise an oxide of a metal $M_3$ which can dissolve in at least one of the oxide of the metal $M_1$ and the oxide of the metal $M_2$. It is desirable that this metal $M_3$ is at least one element of Zr, alkaline earth metals and rare earth elements.

The composite oxide powder of the present invention is characterized in that cerium oxide after calcination at 600° C. for 5 hours has a crystallite diameter of 5 to 10 nm, which is calculated from a half width of an X-ray diffraction peak of $CeO_2$ (220); cerium oxide after calcination at 800° C. for 5 hours has a crystallite diameter of 10 to 20 nm, which is calculated from a half width of an X-ray diffraction peak of $CeO_2$ (220); and cerium oxide after calcination at 1000° C. for 5 hours has a crystallite diameter of 35nm or more, which is calculated from a half width of an X-ray diffraction peak of $CeO_2$ (220).

The composite oxide powder of the present invention is characterized in that pores of 3.5 to 100 nm in diameter have a volume of 0.07 cc/g or more after calcination at 600° C. for 5 hours, and pores of 3.5 to 100 nm in diameter have a volume of 0.04 cc/g or more after calcination at 800° C. for 5 hours. It is more desirable that pores of 3.5 to 100 nm in diameter have a volume of 0.13 cc/g or more after calcination at 600° C. for 5 hours, and pores of 3.5 to 100 nm in diameter have a volume of 0.10 cc/g or more after calcination at 800° C. for 5 hours.

One present inventive method of producing the composite oxide powder of the present invention is characterized in comprising the a steps of:

preparing an aqueous solution or water-contained solution of a chemical compound of a metal $M_1$ and a chemical compound of a metal $M_2$ an oxide of which does not dissolve in an oxide of the metal $M_1$;

precipitating an oxide of the metal $M_1$ or a precursor of the oxide of the metal $M_1$ and an oxide of the metal $M_2$ or a precursor of the oxide of the metal $M_2$ or a chemical compound of these oxides or precursors from the solution; and then calcining the precipitate.

Another present inventive method of producing the composite oxide powder of the present invention is characterized in comprising the steps of:

preparing an aqueous solution or water-contained solution of a chemical compound of a metal $M_1$ and a chemical compound of a metal $M_2$ an oxide of which does not dissolve in an oxide of the metal $M_1$, and a chemical compound of a metal $M_3$ an oxide of which can dissolve in at least one of the oxide of said metal $M_1$ and the oxide of the metal $M_2$;

precipitating an oxide of the metal $M_1$ or a precursor of the oxide of the metal $M_1$, an oxide of the metal $M_2$ or a precursor of the oxide of the metal $M_2$ and an oxide of the metal $M_3$ or a precursor of the oxide of the metal $M_3$, or a chemical compound of these oxides or precursors from the solution; and then calcining the precipitate.

In the above production methods, it is possible to employ precipitating techniques such as (1) adding hydrogen peroxide in obtaining the precipitate, (2) obtaining one of the precipitate of a precursor of the oxide of the metal $M_1$ and the precipitate of the precursor of the oxide of the metal $M_2$, one prior to the other, and (3) carrying out precipitation by neutralization reaction and taking 10 minutes or more from the start to the end of the neutralization reaction.

In the above production methods, it is especially desirable that the precipitate is aged in a suspended state in which water or a water-contained solution is a dispersion medium or in a state in which there is abundant water in a closed system consisting of the precipitation, steam and water. The aging is carried out desirably at or above room temperature, more desirably from 100 to 200° C., and much more desirably from 100 to 150° C.

One catalyst of the present invention is characterized by comprising a catalyst support which includes the composite oxide powder of the present invention, and a noble metal loaded on the catalyst support. It is desirable that the noble metal comprises at least Pt.

Another catalyst of the present invention is characterized in comprising a catalyst support which includes the composite oxide powder of the present invention and a solid solution or composite oxide of zirconia and yttria, and a noble metal loaded on the catalyst support. It is desirable that the noble metal comprises at least Pt. It is preferable that the compositional ratio by weight of the solid solution or composite oxide of zirconia and yttria to the composite oxide powder of the present invention is 0 to 100-100 to 0 exclusive. It is desirable that the molar ratio of zirconia and yttria is $1 \leq Zr/Y \leq 4.5$ in terms of metal elements.

MODES FOR CARRYING OUT THE INVENTION

The composite oxide powder of the present invention comprises particles of a composite oxide of an oxide of a metal $M_1$ and an oxide of a metal $M_2$ which does not dissolve in the oxide of the metal $M_1$, the oxide of the metal $M_1$ and the oxide of the metal $M_2$ being dispersed at the nanometer level.

The term 'being dispersed at the nanometer level' here means to be dispersed at a level at which respective oxides are not observed as independent grains even when measured by a micro analyzer with a high resolution of about 1 nm. One example of this micro analyzer is a field emission scanning transmission electron microscope (FE-STEM) such as 'HD-2000' produced by HITACHI, Ltd.

The state of the oxide of the metal $M_1$ and the oxide of the metal $M_2$ dispersed at the nanometer level can be confirmed by carrying out analysis on micro areas of one of the composite oxide particles not overlapped by means of energy dispersive X-ray spectrometry (EDS) using a FE-STEM with a beam of 5-nm or 0.5-nm diameter, the metal $M_1$ and the metal $M_2$ are detected at composition in ±20% of charge composition at 90% or more of respective analytical points.

Since the oxide of the metal $M_1$ and the oxide of the metal $M_2$ which do not dissolve in each other serve as a barrier to each other, the composite oxide powder of the present invention is suppressed from being sintered at high temperature and can maintain a high volume of meso pores even after exposed to high temperature for a long time. The "meso pores" mean pores of 2 to 50 nm in diameter according to the IUPAC system, but sometimes mean pores of 1.5 to 100 nm in accordance with the adsorption characteristics of molecules. In the present invention the "meso pores" are defined as pores in the range from the lower measurable-by-a-mercury-porosimeter limit 3.5 nm to 100 nm.

For example, composite oxide powder employing Ce as a metal $M_1$ will be described. In the composite oxide of cerium oxide and an oxide of a metal M2 which 'does not dissolve in cerium oxide', the state of 'not dissolving in cerium oxide' is defined as follows upon X-ray diffraction measurement:

The state of 'not dissolving in cerium oxide' is to obtain a diffraction pattern within ±0.01 of the lattice constant of $CeO_2$ (JCPDS 34-394) in consideration of an error in setting an X-ray diffraction apparatus and a lattice disorder caused by non-application of high heat in history.

However, when this composite oxide is further formed into a composite oxide with an oxide of a metal $M_3$ in order to improve heat stability of cerium oxide, i.e., when an oxide of a metal M3 is dissolved in cerium oxide, the above definition is not applied because of a change in $CeO_2$ lattice constant as a criterion for the oxide of the metal $M_2$ which 'does not dissolve in cerium oxide'. In this case, similar judgement should be given using as a criterion a lattice constant of $CeO_2$ in which the metal $M_3$ is dissolved.

In the composite oxide powder of the present invention, the metal $M_1$ is desirably Ce. In this case, it is desirable that the crystallite diameter of cerium oxide calculated from a half width of an X-ray diffraction peak of $CeO_2$ (220) is 5 to 10 nm after calcination at 600° C. for 5 hours, 10 to 20 nm after calcination at 800° C. for 5 hours and 35 nm or more after calcination at 1000° C. for 5 hours. With these characteristics, sintering less occurs even after exposed to high temperature and pores of 3.5 to 100 nm in diameter have a volume of 0.07 cc/g or more after calcination at 600° C. for 5 hours and pores of 3.5 to 100 nm in diameter have a volume of 0.04 cc/g or more after calcination at 800° C. for 5 hours. Thus, the pore volume can be sufficiently secured even after exposed to high temperature for a long time.

It is desirable that pores of 3.5 to 100 nm in diameter have a volume of 0.13 cc/g or more after calcination at 600° C. for 5 hours and pores of 3.5 to 100 nm in diameter have a volume of 0.10 cc/g or more after calcination at 800° C. for 5 hours. It is more desirable that pores of 3.5 to 100 nm in diameter have a volume of 0.19 cc/g or more after calcination at 600° C. for 5 hours and pores of 3.5 to 100 nm in diameter have a volume of 0.15 cc/g or more after calcination at 800° C. for 5 hours. It is much more desirable that pores of 3.5 to 100 nm in diameter have a volume of 0.25 cc/g or more after calcination at 800° C. for 5 hours.

In a catalyst of the present invention comprising this composite oxide powder and a noble metal loaded thereon, the noble metal is loaded on meso pores in a highly dispersed state, and these meso pores offer places for reaction, and accordingly catalytic activity is very high. Besides, even after exposed to high temperature for a long time, the meso pores, where the noble metal is loaded, exist in a sufficient volume and the specific surface area can be maintained sufficiently large. In addition, because sintering of the oxide is suppressed, noble metal grain growth is also suppressed and catalytic activity after exposed to high temperature for a long time can be strongly suppressed from decreasing.

Composite oxide powder according to another aspect of the present invention comprises particles of the above composite oxide of the metal $M_1$ and the metal $M_2$, and particles of the oxide of the metal $M_2$, and a mixture in which the particles of the composite oxide of the metal $M_1$ and the metal $M_2$ and the particles of the oxide of the metal $M_2$ are dispersed at the level of not more than 50 nm is contained by 90% of the total weight of the composite oxide powder.

Since the particles of the oxide of the metal $M_2$ interposes at the level of not more than 50 nm between the particles of the composite oxide powder of the metal $M_1$ and the metal $M_2$, sintering is much more suppressed even after exposed to high temperature and pores of 3.5 to 100 nm in diameter secure a volume of 0.07 cc/g or more after calcination at 600° C. for 5 hours and pores of 3.5 to 100 nm in diameter secure a volume of 0.04 cc/g or more after calcination at 800° C. for 5 hours. Thus sufficient pore volume is secured even after exposed to high temperature for a long time.

Therefore, a catalyst comprising this composite oxide powder and a noble metal loaded thereon is excellent in durability because catalytic activity after exposed to high temperature for a long time is much suppressed from decreasing.

Moreover, since the oxide of the metal $M_2$ exists independently in this catalyst, this catalyst attains improved stability of the noble metal loaded and improved noble metal catalytic activity in a low-oxygen-partial-pressure atmosphere.

In the above composite oxide, the dispersion level of more than 50 nm is not favorable, because the effect of the particles of the oxide of the metal $M_2$ interposing between the particles of the composite oxide of the metal $M_1$ and the metal $M_2$ is small and accordingly the specific surface area decreases and activity as a catalyst declines. On the other hand, when the mixture dispersed at the level of not more than 50 nm is contained by less than 90% of the total weight of the composite oxide powder, the interposing effect of the particles of the metal $M_2$ is small and sintering relatively tends to occur when exposed to high temperature for a long time.

By the way, a catalyst formed by loading a noble metal on $CeO_2$ has excellent CO oxidization activity. Even when placed in actual exhaust gases, such a catalyst can convert CO from a low temperature range, decrease Co adsorption poisoning on a catalyst surface and convert HC also from a low temperature range. However, the conventional $CeO_2$ powder has defects in that after exposed to high temperature for a long time as in the use in actual exhaust gases, the pore volume gets smaller and the specific surface area decreases and as a result CO oxidation activity also lowers.

For instance, Ce can be selected as a metal $M_1$. When Ce is used as a metal $M_1$, examples of a metal $M_2$ include Al, Ti, Si, oxides of which do not dissolve in $CeO_2$. It is particularly preferable to employ Al, which is excellent in noble metal stability and heat resistance.

When Ce is employed as a metal $M_1$ and Al is employed as a metal $M_2$, $CeO_2$—$Al_2O_3$ composite oxide powder according to the present invention secures the characteristics of CeO 2 and at the same time attains an improved heat resistance, a high specific surface area and an extremely large volume of meso pores, which serve as a place for a noble metal or catalytic activities. When analysis on micro areas of one of the composite oxide particles not overlapped is carried out by means of EDS using a FE-STEM with a beam of 0.5-nm diameter, $CeO_2$ and $Al_2O_3$ are detected at composition in ±20% of charge composition at 90% or more of respective analytical points.

This analytical result and X-ray diffraction result mentioned later show that $Al_2O_3$ exists as an amorphous $Al_2O_3$ coating or γ—$Al_2O_3$ microcrystals on the surface of $CeO_2$ particles. Since $Al_2O_3$ exists as a barrier between $CeO_2$ particles, the composite oxide particle of the present invention is excellent in heat resistance. Although a noble metal loaded on $CeO_2$ is hardly sintered in general, the use of this $CeO_2$—$Al_2O_3$ composite oxide power as a catalyst support attains remarkably improved heat stability and noble metal grain growth suppression.

$CeO_2$ is contained in the above composite oxide powder preferably in an amount of 50% by weight or more, and more preferably in an amount of 75% by weight or more. Accordingly, $Al_2O_3$ is contained preferably in an amount of less than 50% by weight, and more preferably in an amount of less than 25% by weight. When $CeO_2$ is less than 75% by weight or 50% by weight, a catalyst constituted by the composite oxide powder does not exhibit the advantage of a noble metal/$CeO_2$ catalyst, i.e., excellent CO conversion efficiency in a low temperature range.

The noble metal of the present invention is preferably Pt alone or Pt in combination with another noble metal. The Pt content is preferably 0.05 to 30% of the total weight of the above composite oxide powder. When the Pt content is less than 0.05% by weight, the effect of igniting CO at low temperature and water gas shift reactability are not exhibited sufficiently. When the Pt content exceeds 30% by weight, Pt sometimes blocks meso pores and the effect of preventing Pt from sintering is not exhibited sufficiently.

By the way, it is inevitable that even a noble metal loaded on a catalyst support comprising $CeO_2$—$Al_2O_3$ composite oxide powder degrades in its catalytic activity by a high temperature endurance test. However, it has become apparent that a noble metal (Pt in particular) loaded on such a basic oxide as $CeO_2$ can lessen its catalytic activity degradation or recover its original catalytic activity by applying oxidation-reduction treatment under appropriate conditions after an endurance test.

That is to say, when the catalyst of the present invention degrades in its catalytic activity, it is preferable to apply oxidation treatment by treating the catalyst in an oxidizing atmosphere at a high temperature of 600° C. or more and reduction treatment by treating the oxidation-treated catalyst in a stoichiometric or reducing atmosphere at a temperature of 800° C. or less. Owing to these treatments, the noble metal loaded can be dispersed again and recover catalytic activity.

Since such a basic oxide as $CeO_2$ has a strong interaction with a noble metal, the aforementioned oxidation treatment can make the noble metal component wet on the surface of particles of the basic oxide. When the above reduction treatment is applied after the oxidation treatment, Pt, for instance, reprecipitates as metal grains by a reduction reaction. At this time, if the basic oxide has a sufficiently high specific surface area, a lot of ultrafine Pt metal nuclei are generated toward the basic oxide on the wet surface of the Pt component, and the Pt metal precipitates as nano-sized particles. It is supposed that catalytic activity is recovered by this mechanism.

The oxidation treatment is carried out by treating the catalyst in a reducing atmosphere at a high temperature of 600° C. or more. With the temperature below 600° C., there is no reaction between the noble metal whose grains have grown and the basic oxide, and in the following reduction step, reprecipitation and high dispersion of noble metal nano-sized particles are difficult. The upper limit of the temperature is not specified but, of course, it must be below the decomposition temperature of the catalyst support. However, in general, as the temperature increases, treatment time can be shortened. Therefore, the oxidation treatment is conducted preferably at or above 600° C. and more preferably at or above 800° C.

The oxidizing atmosphere in the oxidation treatment means an atmosphere in which an equivalent of oxidizing components such as $O_2$ is stoichiometrically larger than an equivalent of reducing components such as CO and HC. It is desirable that the equivalent ratio of the oxidizing components to the reducing components is 1.05 or more. When this equivalent ratio is less than 1.05, oxidation treatment is difficult. Although the oxidation treatment can be carried out in the air while heating the catalyst, it is desirable that the oxidation treatment is carried out in exhaust gases. In this case, the atmosphere is preferably an exhaust gases atmosphere wherein combustion was conducted at an air/fuel ratio of not less than 15.

The time for oxidation treatment is determined in accordance with the treatment temperature and the degree of the oxidizing atmosphere. For example, when the catalyst is heated in the air, the treatment time is preferably 1 minute or more. When the treatment time is shorter than this range, solid phase reaction between the noble metal and the oxide does not occur sufficiently, and in the following reduction treatment, the noble metal cannot precipitate sufficiently as micro particles and catalytic activity is difficult to be recovered.

The reduction treatment is carried out by treating the oxidation-treated catalyst in a stochiometric atmosphere or a reducing atmosphere at not more than 800° C. The treatment temperature over 800° C. is not preferable, because the oxide particles coagulate thermally and the specific surface area decreases. Although the lower limit of the reduction treatment temperature is not specified, the range of 300 to 600° C. is practical in view of treatment in the actual exhaust gases.

The stoichiometric atmosphere in the reducing treatment means an atmosphere in which the equivalent of oxidizing components such as $O_2$ is stoichiometrically equal to the equivalent of reducing components such as CO and HC. The reducing atmosphere in the reducing treatment means an atmosphere in which the equivalent of oxidizing components such as $O_2$ is stoichiometrically smaller than the equivalent of reducing components such as CO and HC. It is desirable that the equivalent ratio of the oxidizing components to the reducing components is 1 or less. When the equivalent ratio is larger than 1, the reduction treatment temperature becomes longer and sometimes no reduction occurs. Although the reduction treatment can be carried out by heating the catalyst, for example, in the CO gas, it is desirable that the reduction treatment is carried out in exhaust gases. In this case, the atmosphere is preferably an exhaust gases atmosphere wherein combustion is carried out at an air/fuel ratio of 14.6 or less.

The time for reduction treatment is determined in accordance with the treatment temperature and the degree of the reducing atmosphere. For example, when the reduction treatment is carried out by heating the catalyst in exhaust gases in the stoichiometric atmosphere, the time is preferably 1 minute or more. When the treatment time is shorter than this range, almost no noble metal grains precipitate and catalytic activity is difficult to be recovered.

Although the oxidation treatment and the reducing treatment can be carried out after taking out the catalyst from an exhaust gases passage, they are preferably carried out while placing the catalyst in the exhaust gases passage. For example, physical quantity about actual catalytic activity is to be detected and when the catalyst is determined as degraded, oxidation treatment is carried out by introducing exhaust gases in a fuel-lean atmosphere at a high temperature of 700° C. or more through the catalyst. Then, after a predetermined time passes, reduction treatment is carried out by introducing exhaust gases in the stoichiometric atmosphere or a fuel-rich atmosphere at 600° C. or less. By doing this, the oxidation treatment and the reduction treatment can be carried out in continuation to the use of the catalyst and the degraded catalyst can recover its catalytic activity automatically.

The composite oxide powder of the present invention can include Zr, alkaline earth metals and rare earth elements as a metal $M_3$. The use of these elements sometimes attributes to an improvement in heat resistance of the oxide of the metal $M_1$ or the oxide of the metal $M_2$ and in oxygen storage capability of $CeO_2$.

One present inventive method of producing this composite oxide powder of the present invention comprises the steps of preparing an aqueous solution or water-contained solution of a chemical compound of a metal $M_1$ and a chemical compound of a metal $M_2$ an oxide of which does not dissolve in an oxide of the metal $M_1$; and precipitating an oxide of the metal $M_1$ or a precursor of the oxide of the metal $M_1$ and an oxide of the metal $M_2$ or a precursor of the oxide of the metal $M_2$ or a chemical compound of these oxides or precursors from the solution.

Another method according to the present invention comprises the steps of preparing an aqueous solution or water-contained solution of a chemical compound of a metal $M_1$ and a chemical compound of a metal $M_2$ an oxide of which does not dissolve in an oxide of the metal $M_1$, and a chemical compound of a metal $M_3$ an oxide of which can dissolve in at least one of the oxide of the metal $M_1$ and the oxide of the metal $M_2$; and precipitating an oxide of the metal $M_1$ or a precursor of the oxide of the metal $M_1$, an oxide of the metal $M_2$ or a precursor of the oxide of the metal $M_2$ and an oxide of the metal $M_3$ or a precursor of the oxide of the metal $M_3$, or a chemical compound of these oxides or precursors from the solution.

At this time, by increasing the amount of the chemical compound of the metal $M_2$, it becomes possible to produce composite oxide powder, comprising: composite oxide particles comprising the oxide of the metal $M_1$ and the oxide of the metal $M_2$ which does not dissolve in the oxide of the metal $M_1$, the oxide of the metal $M_1$ and the oxide of the metal $M_2$ being dispersed at the nanometer level; and particles of the oxide of the metal $M_2$; a mixture in which the composite oxide particles and the particles of the oxide of the metal $M_2$ are dispersed at the level of not more than 50 nm being contained by 90% or more of the total weight of the composite oxide powder.

In general, salts are employed as a chemical compound of a metal $M_1$, a chemical compound of a metal $M_2$ an oxide of which does not dissolve in an oxide of the metal $M_1$, and a chemical compound of a metal $M_3$ an oxide of which can dissolve in at least one of the oxide of the metal $M_1$ and the oxide of the metal $M_2$. Examples of the salts include sulfate, nitrate, hydrochloride and acetate. Water and alcohols are employable as a solvent for dissolving salts uniformly. Besides, for example, a mixture of aluminum hydroxide, nitric acid and water can be used as raw materials of aluminum nitrate.

Precipitation is carried out by controlling the pH mainly by adding aqueous ammonia or the like, and it is possible to obtain a precursor of a characteristic composite oxide by various control methods. One example of the methods is to prepare an aqueous solution or water-contained solution containing a chemical compound of a metal $M_1$ and a chemical compound of a metal $M_2$ (and/or a chemical compound of a metal $M_3$) and precipitate oxides precursors of oxides of these or a chemical compound of the precursors almost simultaneously from the solution. Another example of the methods is to precipitate an oxide or a precursor of the oxide of the metal $M_2$ prior to precipitation of a precursor of the oxide of the metal $M_1$ from the solution (or vice versa).

The former method of obtaining precipitates almost simultaneously can be carried out, for instance, by adding aqueous ammonia at a time and stirring the solution vigorously, or by adding hydrogen peroxide, etc. to control the pH at which a precursor of the oxide of the metal $M_1$ and a precursor of the oxide of the metal $M_2$ (and/or a precursor of the oxide of the metal $M_3$ or a precursor of a composite oxide or solid solution containing the metal $M_3$) start precipitating and then adding aqueous ammonia, etc. to obtain precipitate.

The latter method can be carried out, for instance, by making time for neutralizing the solution with aqueous ammonia long enough, preferably not less than 10 minutes, or by neutralizing the solution gradually to a pH at which a precursor of the oxide of the metal $M_1$ precipitates or a pH at which a precursor of the oxide of the metal $M_2$ precipitates, or adding a buffer solution to maintain the solution at such a pH, while monitoring the pH.

Instead of aqueous ammonia, it is possible to use an aqueous or alcohol solution of ammonium carbonate, sodium hydroxide, potassium hydroxide, sodium carbonate or the like. It is especially preferable to employ ammonia or ammonium carbonate, which evaporates at the time of calcination. It is more preferable that the pH of an alkaline solution is 9 or more because it promotes precursor precipitation.

In the next step, the precipitate thus obtained is calcined, thereby obtaining composite oxide.

When an aging step is employed, heat applied promotes dissolution and re-precipitation and at the same time grain growth. This aging step is carried out at or above room temperature, preferably in the range of 100 to 200° C., and more preferably in the range of 100 to 150° C. With the heat of less than 100° C., the effect of promoting the aging is small and it takes a great time for the aging. On the other hand, with the heat above 200° C., water vapor pressure is very high and a large-scale apparatus which can stand high pressure is necessary. Production costs for such an apparatus is very high, which is a demerit. In the next step, the precipitate thus obtained is calcined, thereby obtaining composite oxide with a relatively high crystallity, i.e., crystallites of a large diameter.

This calcination step can be carried out in the air and the calcination temperature is preferably in the range from 300 to 900° C. With the calcination temperature below 300° C., the composite oxide powder substantially lacks stability as a catalyst support. With the calcination temperature above 900° C., the specific surface area is decreased and such heating is unnecessary in view of the use as a to catalyst support.

If the solution containing precipitate continues to be heated so that the solution is vaporized and the residue is dried and calcined, the aging step can be carried out during evaporation and drying. However, it is preferable to hold the precipitate for the aging at or above room temperature, and more preferably above 100° C.

By the way, exhaust gases contain a large amount of $H_2O$, which is sometimes adsorbed on the surface of the noble metal and decreases noble metal catalytic activity. In the case of the catalyst comprising the composite oxide powder of the present invention using Ce as a metal $M_1$, and Pt or noble metals including Pt loaded thereon, $H_2O$ can be consumed by water gas shift reaction. The water gas shift reactability is much improved in the case of a catalyst comprising a mixture of the composite oxide powder of the present invention and $ZrO_2$—$Y_2O_3$ solid solution powder, and Pt or noble metals including Pt loaded thereon.

The amount of Pt loaded is preferably in the range from 0.05 to 30% by weight with respect to the composite oxide powder of the present invention or a mixture of the composite oxide powder of the present invention and $ZrO_2$—$Y_2O_3$ solid solution powder. When the Pt amount is less than 0.05% by weight, the effect of igniting CO at low temperature and water gas shift reaction activity are not exhibited sufficiently. When the Pt amount is more than 30% by weight, Pt sometimes blocks the meso pores and the effect of preventing Pt from sintering is not exhibited sufficiently.

A catalyst can be formed by loading Pt on a mixture of the composite oxide powder of the present invention and $ZrO_2$—$Y_2O_3$ solid solution powder. The merit of employing the Pt-loaded mixture including $ZrO_2$—$Y_2O_3$ solid solution powder is that the $ZrO_2$—$Y_2O_3$ solid solution powder loaded with Pt or noble metals including Pt also exhibits water gas shift reaction activity, and that owing to superior resistance to sulfur poisoning, the $ZrO_2$—$Y_2O_3$ solid solution powder can prevent catalytic activity from deterioration caused by sulfur poisoning especially when used for a catalyst for purifying exhaust gases.

In the $ZrO_2$—$Y_2O_3$ solid solution powder of the present invention, the content ratio of zirconium and yttrium is $1 \leq Zr/Y \leq 4.5$ in terms of atoms, and at least part of zirconia and yttria is a solid solution. A catalyst comprising this $ZrO_2$—$Y_2O_3$ solid solution powder and Pt or noble metals including Pt loaded thereon is improved in durability since noble metal grain growth is suppressed even in the use at high temperature. The reason of this improvement is not clear but it is supposed that Zr and Y dissolve into a noble metal to form an alloy and accordingly noble metal recrystallization temperature is increased, and as a result noble metal grain growth is suppressed.

Sulfur oxides adsorbed on $ZrO_2$—$Y_2O_3$ solid solution powder form composite sulfate. This composite sulfate decompose easily probably because it is more unstable than a sulfate of zirconia or yttria alone. By recovering the water vapor adsorption capability at water adsorption sites of the catalyst support, hydrogen generation capability is suppressed from decreasing.

$ZrO_2$—$Y_2O_3$ solid solution powder is required to have the atomic ratio of Zr and Y in the range of $1 \leq Zr/Y \leq 4.5$, preferably $2 \leq Zr/Y < 4.2$, and more preferably $2 \leq Zr/Y \leq 3.5$. When the Y content is small and the atomic ratio of Zr to Y is greater than 4.5, the effect of suppressing a noble metal from sintering is lowered. When the Y content is high and the atomic ratio of Zr/Y is smaller than 1, the influence of Y is too great and heat resistance of the catalyst support deteriorates. When the Y content is small and the atomic ratio of Zr to Y is greater than 4.5, suppression of sulfur poisoning is difficult and accordingly hydrogen generation capability after endurance test is lowered.

It is to be noted that in the conventional partially stabilized zirconia, the atomic ratio of Zr to Y is greater than 4.5 and commonly about 9. For example, Japanese Unexamined Laid-Open Patent Publication No.Hei3-80937 discloses partially stabilized zirconia having a yttria content of 0.5 to 12 mol %, preferably 1.0 to 8 mol %, and more preferably 1.5 to 6 mol %. In its preferred embodiments, the yttria content ranges from 0.3 to 8 mol %. It is assumed from these descriptions that the conventional partially stabilized zirconia does not include $ZrO_2$—$Y_2O_3$ solid solution powder.

When the Y content is high and the atomic ratio of Zr to Y is not more than 4.5 as in the present invention, almost all is a solid solution in cubic system. Although heat resistance of the $ZrO_2$—$Y_2O_3$ solid solution powder of the present invention is a little lower than that of the conventional partially stabilized zirconia, the effect of suppressing noble metal grain growth and the effect of suppressing sulfur poisoning substantially overcome a disadvantage caused by a decrease in heat resistance. Therefore, hydrogen generation capability after endurance test is improved by far.

Examples of the metal M besides to Ce include Zr, Ti, Fe, Al, Si, Mn, Co, Ni, Nb, Mo, Ta and W. The metal $M_2$ can be various metals oxides of which do not dissolve in the oxide of the metal $M_1$. Each of the oxide of the metal $M_1$ and the oxide of the metal $M_2$ is not limited to an oxide of a single metal but can be a composite oxide of two or more kinds of metals. For example, when Zr is selected as a metal $M_1$, an oxide of a metal $M_2$ can be $Al_2O_3$, $ZrSiO_4$ and so on.

An oxide of the metal $M_3$ has an effect of improving heat resistance, sulfur poisoning resistance, oxygen storage capability and so on by dissolving in at least one of the metal $M_1$ and the metal $M_2$.

The present invention has the following advantages:

The composite oxide powder of the present invention has large meso pore volume even after high temperature durability test. Therefore, a catalyst comprising this composite oxide powder and a noble metal loaded thereon exhibits high catalytic activity even after high temperature durability test, because noble metal grain growth is suppressed and a highly dispersed state of the noble metal can be maintained even after high temperature durability test. A catalyst comprising the composite oxide powder of the present invention which uses Ce as a metal $M_1$ and a noble metal loaded thereon can enjoy the feature of a noble metal-loaded $CeO_2$: It can maintain high CO conversion efficiency at low temperature, and also can maintain high HC conversion activity and $H_2$ generation activity caused by water gas shift reaction even after high temperature endurance test.

The method for producing oxide powder according to the present invention can easily and securely produce composite oxide powder which can maintain large meso pore volume even after high temperature endurance test.

BRIEF DESCRIPTION OF THE DRAWINGS

The exact nature of this invention, as well as other objects and advantages thereof, will be readily apparent from consideration of the following specification relating to the annexed drawings in which.

DESCRIPTION OF THE PREFERRED EMBODIMENTS

Figure 1:
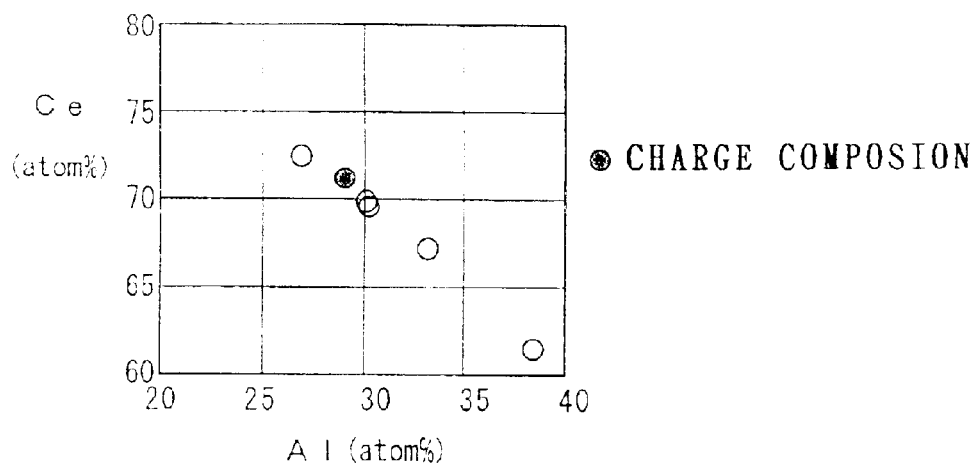
FIG. 1 is a distribution map of atomic ratios of Al and Ce, obtained by elemental analysis of composite oxide powder of Example 1 in the range of 0.5 nm in diameter.

The present invention will now be described concretely by way of examples and comparative examples.

EXAMPLE 1

0.2 mol (75.1 g) of aluminum nitrate 9-hydrate was mixed with 2000 ml of ion exchange water, and dissolved by stirring with a propeller mixer for 5 minutes. Then 304 g (0.5 mol in terms of $CeO_2$) of an aqueous solution containing 28% by weight of cerium nitrate was mixed to the solution and stirred for another 5 minutes.

177 g of 25% aqueous ammonia was added to the obtained mixed aqueous solution and stirred for another 10 minutes, thereby preparing an aqueous solution containing precipitate. Then an aging step was carried out by applying heat treatment to the aqueous solution containing the precipitate at 120° C. for 2 hours under a pressure of 2 atm, thereby aging the precipitate.

Then, the aqueous solution containing the aged precipitate was heated at a temperature rising rate of 100° C./hour and calcined at 400° C. for 5 hours, thereby preparing $CeO_2$—$Al_2O_3$ composite oxide powder. The obtained $CeO_2$—$Al_2O_3$ composite oxide powder is composed of about 89% by weight of $CeO_2$ and about 11% by weight of $Al_2O_3$.

EXAMPLE 2

$CeO_2$—$Al_2O_3$ composite oxide powder was prepared in a similar way to Example 1, except that the step of aging the precipitate by applying heat treatment at 120° C. for 2 hours under a pressure of 2 atm was not carried out.

EXAMPLE 3

Composite oxide powder was prepared in a similar way to Example 1, except that 0.02 mol (5.23 g) of barium nitrate was further added to the mixed aqueous solution of aluminum nitrate 9-hydrate and cerium nitrate and that the amount of 25% aqueous ammonia added was 180 g. The obtained composite oxide powder is composed of about 87 wt % $CeO_2$, about 10 wt % $Al_2O_3$ and about 3 wt % BaO.

EXAMPLE 4

Composite oxide powder was prepared in a similar way to Example 1, except that the amount of aluminum nitrate 9-hydrate added was 0.1 mol (37.6 g) and that the amount of 25% aqueous ammonia added was 157 g. This composite oxide powder is composed of about 94 wt % $CeO_2$ and about 6 wt % $Al_2O_3$.

EXAMPLE 5

Composite oxide powder was prepared in a similar way to Example 2, except that the amount of aluminum nitrate 9-hydrate added was 0.1 mol and that the amount of 25% aqueous ammonia added was 157 g. This composite oxide powder is composed of about 94 wt % $CeO_2$ and about 6 wt % $Al_2O_3$ in the same way as Example 2. The precipitate was somewhat aged during the calcination but the aging was as insufficient as in Example 2.

EXAMPLE 6

Composite oxide powder was prepared in a similar way to Example 2, except that 62 g of 30% hydrogen peroxide solution was additionally mixed in the mixed solution of aluminum nitrate 9-hydrate and cerium nitrate before aqueous ammonia was added.

This composite oxide powder is composed of about 89 wt % $CeO_2$ and about 11 wt % $Al_2O_3$ in the same way as Example 1.

Comparative Example 1

Oxide powder was prepared in a similar way to Example 1, except that aluminum nitrate 9-hydrate was not employed and that the amount of 25% aqueous ammonia added was 136 g. This oxide powder is composed of $CeO_2$ alone.

Comparative Example 2

Oxide powder was prepared in a similar way to Example 2, except that aluminum nitrate 9-hydrate was not employed and that the amount of 25% aqueous ammonia added was 136 g. This oxide powder is composed of $CeO_2$ alone in the same way as Comparative Example 1. The precipitate was somewhat aged during the calcination, but the aging was as insufficient as in Example 2.

Comparative Example 3

97.2 g of aqueous solution containing 18 wt % zirconium oxynitrate was mixed with 2000 ml of ion exchange water, and dissolved by stirring with a propeller mixer for 5 minutes. Then 295 g of aqueous solution containing 28 wt % cerium nitrate was added to the solution and stirred for another 5 minutes.

573 g of 25% aqueous ammonia was added to the obtained mixed aqueous solution and stirred for another 10 minutes. The obtained precipitate was filtered and heated at a temperature rising rate of 100° C./hour and calcined at 400° C. for 5 hours.

The obtained composite oxide powder is composed of about 82.5 wt % $CeO_2$ and about 17.5 wt % $ZrO_2$, and at least part of $ZrO_2$ has dissolved into $CeO_2$.

<Experiment and Evaluation>

The composition and production method of the composite oxide powders of the examples and the comparative examples are summarized in Table 1.

TABLE 1

| | COMPOSITION & WEIGHT RATIO | AGING | CALCINATION CONDITION | REMARKS |
|---|---|---|---|---|
| Ex. 1 | $CeO_2$—$Al_2O_3$ 89:11 | ○ | in sufficient water | |
| Ex. 2 | $CeO_2$—$Al_2O_3$ 89:11 | X | insufficient water | |
| Ex. 3 | $CeO_2$—$Al_2O$—BaO 87:10:3 | ○ | insufficient water | |
| Ex. 4 | $CeO_2$—$Al_2O_2$ 94:6 | ○ | insufficient water | |
| Ex. 5 | $CeO_2$—$Al_2O_3$ 94:6 | X | insufficient water | |
| Ex. 6 | $CeO_2$—$Al_2O_2$ 89:11 | X | insufficient water | * |
| Comp. Ex. 1 | $CeO_2$ | ○ | insufficient water | |
| Comp. Ex. 2 | $CeO_2$ | X | insufficient water | |
| Comp. Ex. 3 | $CeO_2$:$ZrO_2$ 82.5:17.5 | X | calcination after filtration | |

*$H_2O_2$ was added at the time of precipitation

Elemental analysis on one of the non-overlapped particles of the composite oxide powder of Example 1 was carried out by means of EDS using an FE-STEM with a beam of 0.5-nm diameter. The result is shown in FIG. 1. As for analytical conditions, 'HD-2000' produced by Hitachi, ltd. was used at an acceleration voltage of 200 kV. This apparatus was equipped with an EDX detector 'Vatage EDX System' produced by NCRAN Co. Ltd., which could conduct elemental analysis with high sensitivity by detecting characteristic X-rays emitted from samples.

As apparent from FIG. 1, even when analysis was conducted on micro areas with a beam of 0.5-nm diameter, the compositional distribution of Ce and Al fell in a very limited area in ±10% of the theoretical atomic ratio (Ce:Al=71:29). If $CeO_2$ and $Al_2O_3$ existed as particles of not less than 0.5nm in diameter, the above measurement should have revealed a number of areas where Ce was 100% or Al was 100%.

Figure 2:
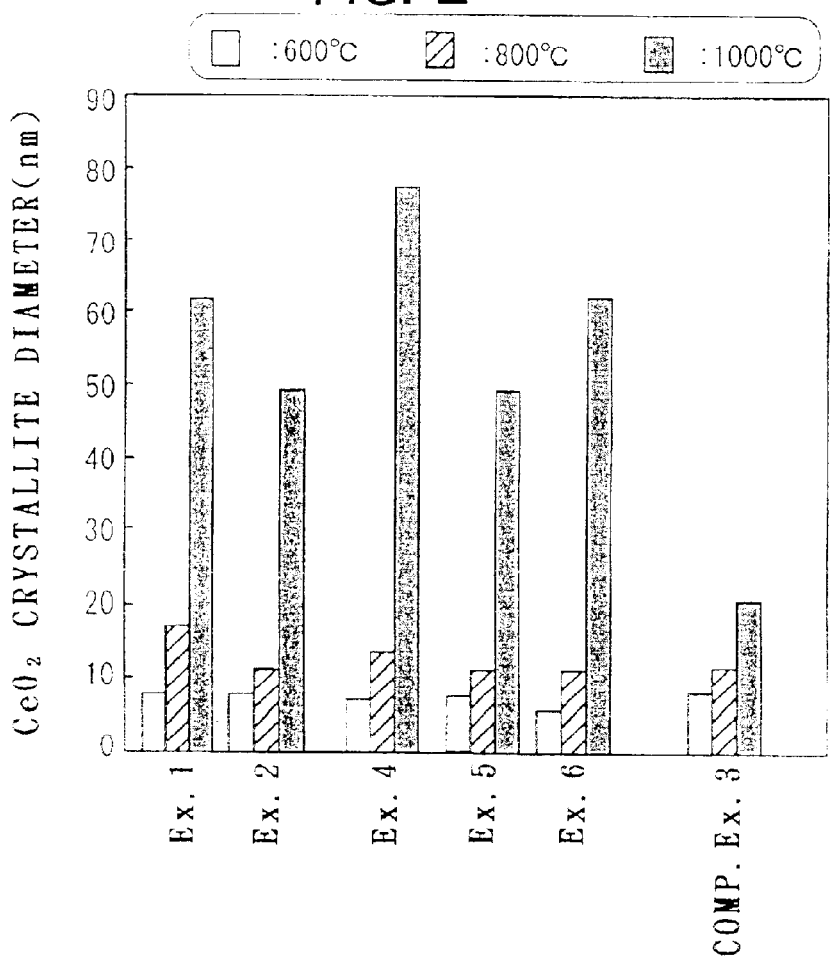
FIG. 2 is a graph showing crystallite diameters of cerium oxide of composite oxide powders of examples and a comparative example.

Composite oxide powders or oxide powders of the examples and the comparative examples were calcined at 600° C., 800° C., and 1000° C. respectively for 5 hours, and then subjected to X-ray diffraction (40 kV-350 mA) measurement. As a result, diffracted rays from $CeO_2$ fell in an error span and no peak shift was admitted. That is, it was clear that $CeO_2$ did not have dissolved in $Al_2O_3$. Also the crystallite diameter of $CeO_2$ was calculated from a half width of an X-ray diffraction peak of $CeO_2$ (220). The results are shown in FIG. 2.

The powders of the respective examples had $CeO_2$ crystallite diameters of 6 to 8 nm after calcination at 600° C. for 5 hours, 12 to 17 nm after calcination at 800° C. for 5 hours and 49 to 79 nm after calcination at 1000° C. for 5 hours.

The results of the elemental analysis and the X-ray diffraction suggest that Al exists as an amorphous $Al_2O_3$ coating or $\gamma$—$Al_2O_3$ microcrystals on the surface of $CeO_2$ particles.

The composite oxide powders or oxide powders of Examples 1, 4 and 6 and Comparative Examples 1 to 3 were calcined at 600° C. and 800° C. respectively for 5 hours and then the volume of pores of 3.5 to 100 nm in diameter was measured about each specimen by a mercury porosimeter. The results are shown in FIG. 3.

Figure 3:
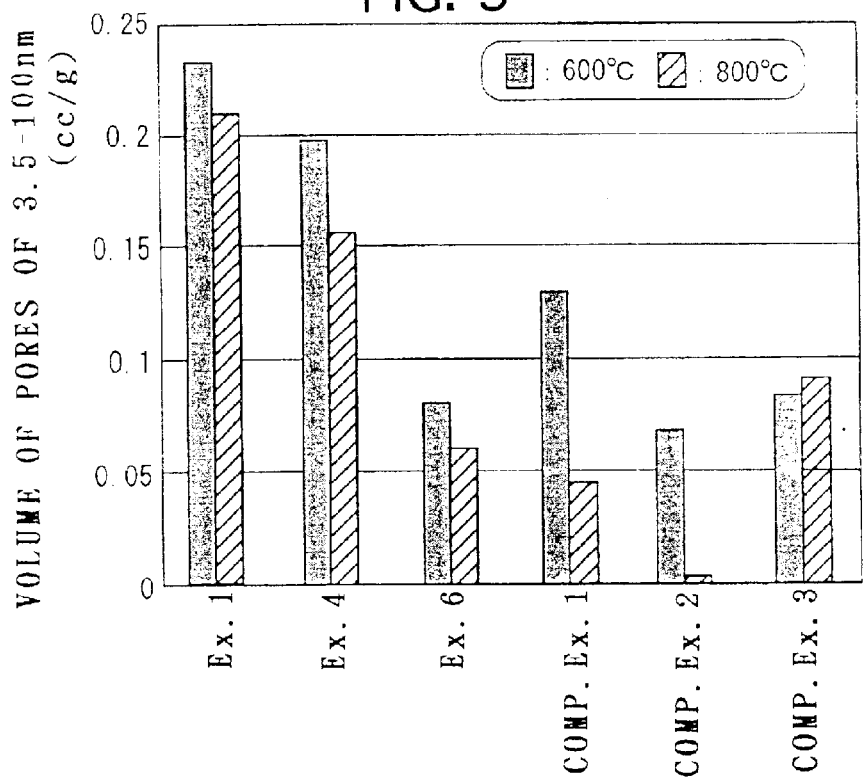
FIG. 3 is a graph showing the volume of pores of 3.5 to 100 nm of oxide powders of examples and comparative examples.

It is apparent from FIG. 3 that in each of the examples, pores of 3.5 to 100 nm in diameter had a volume of 0.07 cc/g or more after calcination at 600° C. for 5 hours and 0.04 cc/g or more after calcination at 800° C. for 5 hours.

Example 6 where $Al_2O_3$, which does not dissolve in $CeO_2$, was added and no aging step was carried out had a larger pore volume than that of Comparative Example 2 where $CeO_2$ alone was used and no aging step was carried out. In Examples 1 and 4 where $Al_2O_3$, which does not dissolve in $CeO_2$, was added and the aging step was carried out, pores of 3.5 to 100 nm in diameter had a volume of 0.13 cc/g or more after calcination at 600° C. for 5 hours and 0.1 cc/g or more after calcination at 800° C. for 5 hours. The pore volume of Examples 1 and 4 were greater than that of Comparative Example 3 where part of $ZrO_2$ dissolved in $CeO_2$ and also greater than Comparative Example 1 where $CeO_2$ alone was used and the aging step was carried out. These results demonstrate the effect of compositing $Al_2O_3$, which does not dissolve in $CeO_2$, and the effect of aging the precipitate.

Figure 4:
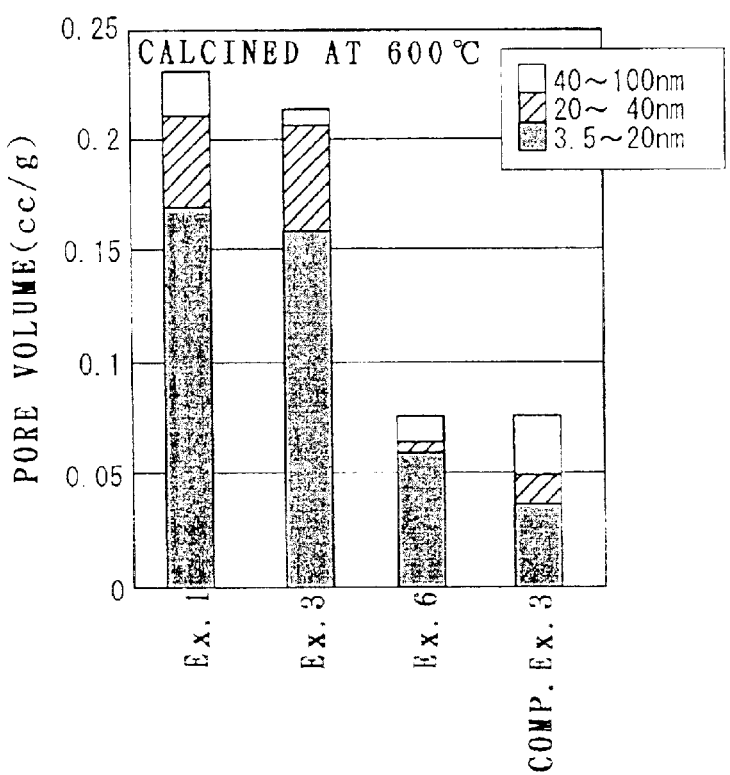
FIG. 4 is a graph showing pore volume of oxide powders of examples and a comparative example after calcination at 600° C.
Figure 5:
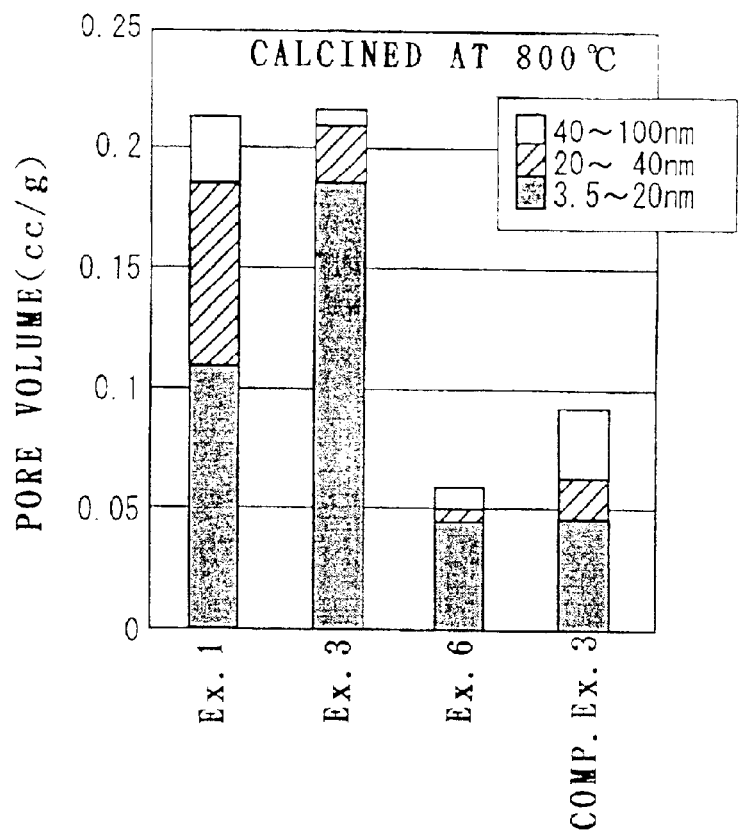
FIG. 5 is a graph showing pore volume of oxide powders of the examples and the comparative example after calcination at 800° C.

With respect to the composite oxide powders of Examples 1, 3, 6 and Comparative Example 3, the volume of pores of 3.5 to 100 nm in diameter after calcination at 600° C. and 800° C. are shown in FIGS. 4 and 5.

As seen from FIGS. 4 and 5, the composite oxides of Examples 1, 3 and 6 had small-sized meso pores of not more than 20 nm as many as or more than those of Comparative Example 3. The composite oxides of Examples 1 and 3 had especially many small-sized meso pores of 20 nm or less. This is supposed to be due to a composite effect of $CeO_2$ and $Al_2O_3$, which does not dissolve in $CeO_2$. Moreover, this is supposed to be also because the aging of the precipitate helped the pores to be controlled into the most suitable size. It is apparent that these pores were maintained even at 800° C. Even after calcination at 800° C., Example 3 had a lot of particularly small-sized meso pores. It was confirmed that addition of Ba is extremely effective to maintain the volume of pores of 3.5 to 20 nm.

EXAMPLE 7

A predetermined amount of composite oxide powder of Example 1 was mixed with a predetermined amount of platinum dinitrodiammine nitrate solution having a predetermined concentration. After vaporizing the solution and drying the residue, the obtained powder was calcined at 500° C. for 2 hours, thereby preparing catalyst powder of this example. 2 g of Pt was loaded with respect to 150 g of the composite oxide powder. This catalyst powder was compressed into pellets, thereby producing pellet catalyst.

EXAMPLE 8

A predetermined amount of composite oxide powder of Example 4 was mixed with a predetermined amount of platinum dinitrodiammine nitrate solution having a predetermined concentration. After vaporizing the solution and drying the residue, the obtained powder was calcined at 500° C. for 2 hours, thereby preparing catalyst powder of this example. 2 g of Pt was loaded with respect to 150 g of the composite oxide powder. This catalyst powder was compressed into pellets, thereby producing pellet catalyst.

Comparative Example 4

A predetermined amount of $\gamma$—$Al_2O_3$ powder which was available on the market was mixed with a predetermined amount of platinum dinitrodiammine nitrate solution having a predetermined concentration. After vaporizing the solution and drying the residue, the obtained powder was calcined at 500° C. for 2 hours, thereby producing catalyst powder of this comparative example. 2 g of Pt was loaded with respect to 150 g of the oxide powder. This catalyst powder was compressed into pellets, thereby producing pellet catalyst.

<Experiment and Evaluation>

An endurance test was carried out on the pellet catalysts of Examples 7 to 8 and comparative Example 4 by heating the catalysts at 800° C. for 5 hours in the air. Then the particle diameter of Pt loaded was measured by CO adsorption method or calculation from a half width of an X-ray diffraction peak of Pt (100). The results are shown in Table 2.

TABLE 2

|  | CO ADSORPTION MEASUREMENT | | X-RAY DIFFRACTION |
|---|---|---|---|
|  | EX. 7 | EX. 8 | COMPARATIVE EX. 4 |
| Pt PARTICLE DIAMETER (nm) | 1.0 | 1.1 | 36.5 |

Each pellet catalyst after the endurance test was placed in a normal-pressure fixed-bed gas-flow type catalytic activity evaluation apparatus and a stoichiometric steady-state gas ($\lambda$=1) was introduced through a bed while the temperature was increased at a rate of 12° C./minute from room temperature to 500° C. Efficiency of converting HC, CO and $NO_x$ of each catalyst was measured continuously while the temperature rose, and temperature at 50% conversion (50% conversion temperature) was thus obtained. The results are shown in FIG. 6.

A similar test was conducted by introducing a stoichiometric variation gas (λ=1±0.02) and measuring 50% conversion temperature. The results are shown in FIG. 7.

Figure 6:
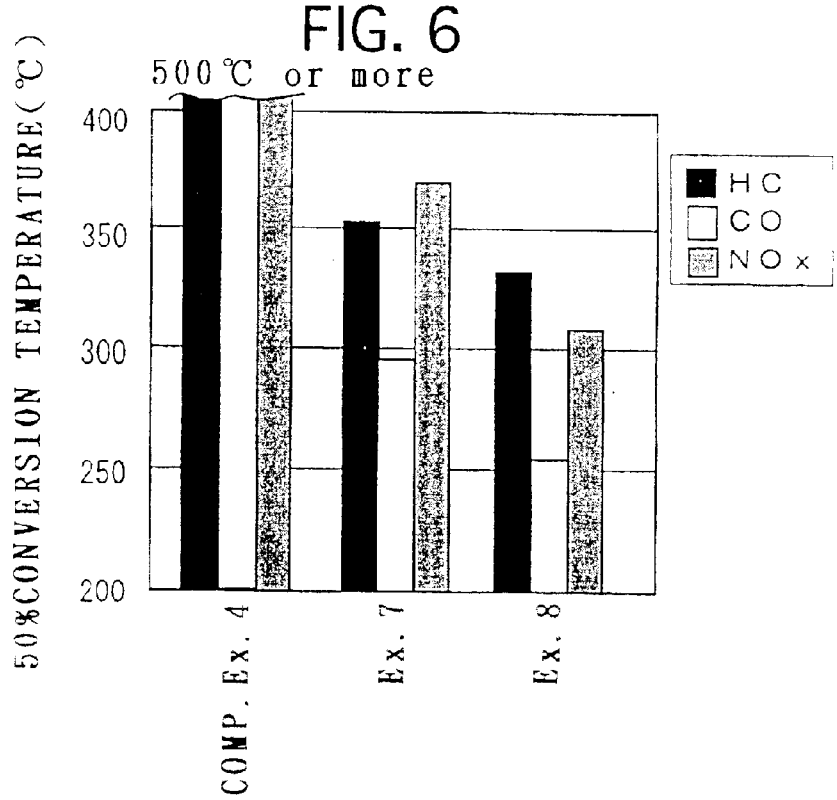
FIG. 6 is a graph showing 50% conversion temperature of catalysts of examples and a comparative example.
Figure 7:
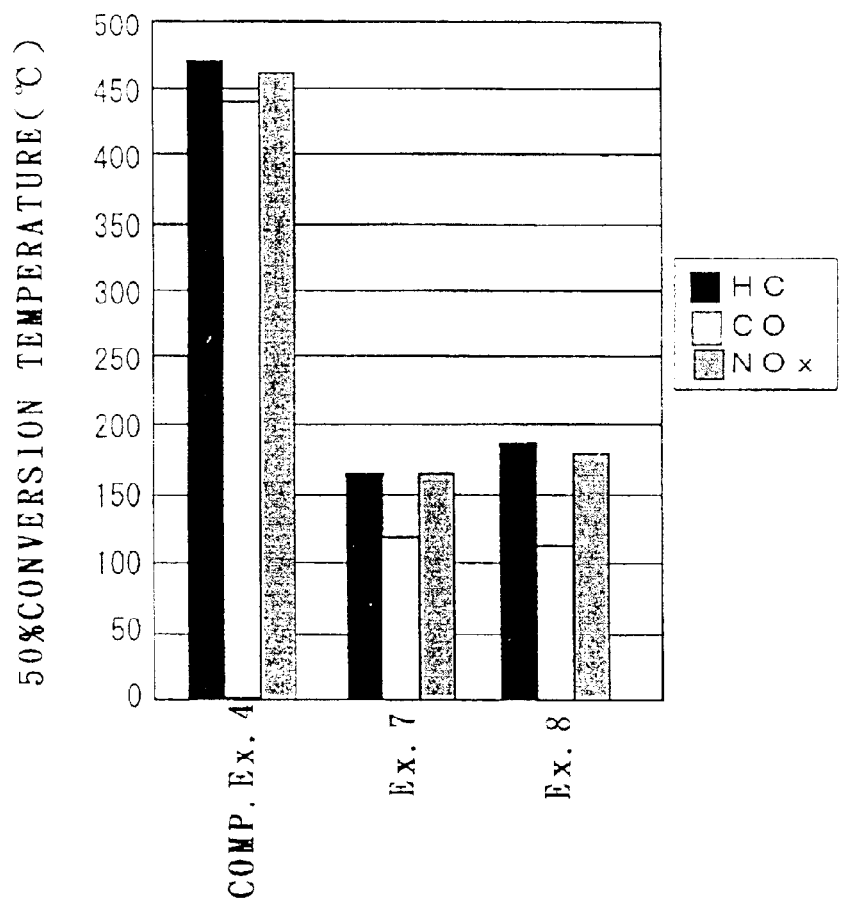
FIG. 7 is a graph showing 50% conversion temperature of the catalysts of the examples and the comparative example.

It is seen from FIGS. 6 and 7 that the catalysts of Examples 7 and 8 had higher conversion efficiency, particularly conversion efficiency at low temperature in the stoichiometric variation atmosphere, than that of Comparative Example 4. Table 2 shows that Pt grain growth was suppressed in the catalysts of Examples 7 and 8. High conversion activity at low temperature is supposed to be owing to suppression of Pt grain growth and CO ignition from low temperature helped by the combination of Pt and $CeO_2$.

EXAMPLE 9

74 g of composite oxide powder of Example 1, 120 g of γ—$Al_2O_3$ powder, water and an alumina-based binder were mixed and pulverized to prepare slurry. This slurry was calcined at 600° C. for 1 hour and pulverized into pellets of 0.5 to 1 mm. A predetermined amount of dinitrodiammine platinum nitrate solution having a predetermined concentration was diluted with water, and the pellets were made to adsorb the diluted solution. After filtration, the pellets were calcined at 500° C. for 2 hours, thereby preparing catalyst powder of this example.

EXAMPLE 10

74 g of composite oxide powder of Example 6, 120 g of γ—$Al_2O_3$, water and an alumina-based binder were mixed and pulverized to prepare slurry. This slurry was calcined at 600° C. for 1 hour and pulverized into pellets of 0.5 to 1 mm. A predetermined amount of dinitrodiammine platinum nitrate solution having a predetermined concentration was diluted with water and the pellets were made to adsorb the diluted solution. After filtration, the pellets were calcined at 500° C. for 2 hours. Next, a predetermined amount of aqueous rhodium nitrate solution having a predetermined concentration was diluted with water, and the pellets were made to adsorb the diluted solution and then dried at room temperature, thereby preparing catalyst powder of this example.

Comparative Example 5

74 g of composite oxide powder of Comparative Example 3, 120 g of γ—$Al_2O_3$ powder, water and an alumina-based binder were mixed and pulverized to prepare slurry. The slurry was calcined at 600° C. for 1 hour and pulverized into pellets of 0.5 to 1 mm. A predetermined amount of dinitrodiammine platinum nitrate solution having a predetermined concentration was diluted with water and the pellets were made to adsorb the diluted solution. After filtration, the pellets were calcined at 500° C. for 2 hours, thereby preparing a catalyst.

Comparative Example 6

74 g of $CeO_2$—$ZrO_2$ solid solution powder at a molar ratio of Ce to Zr=0.9/1.1, 120 g of γ—$Al_2O_3$ powder, 23 g of lanthanum carbonate powder, water and an alumina-based binder were mixed and pulverized to prepare slurry. The slurry was calcined at 600° C. for 1 hour and pulverized into pellets of 0.5 to 1 mm. A predetermined amount of dinitrodiammine platinum nitrate solution having a predetermined concentration was diluted with water and the pellets were made to adsorb the diluted solution. After filtration, the pellets were calcined at 500° C. for 2 hours. Next, a predetermined amount of aqueous rhodium nitrate solution having a predetermined concentration was diluted with water and the pellets were made to adsorb this solution. After filtration, the pellets were dried at room temperature, thereby preparing a catalyst. The amount of loaded Pt on each catalyst of Ex. 9, Ex. 10, Comp. Ex. 5 and Comp. Ex. 6 is 2 g with respect to 150 g of each catalyst powder.

<Experiment and Evaluation>

An endurance test was carried out about the pellet catalysts of Examples 9 and 10 and Comparative Examples 5 and 6 by holding the catalysts at 800° C. for 5 hours while introducing model gases shown in Table 3 alternately at a cycle of the rich gas for 2 minutes and the lean gas for 2 minutes. The gas flow rate was 1 liter/minute with respect to 1 g of each specimen.

TABLE 3

|  | CO (ppm) | $C_3H_6$ (ppm) | $H_2$ (%) | $CO_2$ (%) | $O_2$ (%) | $H_2O$ (%) | $N_2$ |
|---|---|---|---|---|---|---|---|
| RICH GAS | 950 | 746 | 1 | 9.6 | 0.2 | 3 | remainder |
| LEAN GAS | 910 | 710 | — | 9.2 | — | 3 | remainder |

Next, each catalyst after the endurance test was placed in the normal-pressure fixed-bed gas-flow type catalyst evaluation apparatus and the temperature was increased at a rate of 12° C./minute from room temperature to 400° C., while introducing model gases shown in Table 4 alternately at a cycle of the rich gas for 1 second and the lean gas for 1 second. The gas flow rate was 3 liter/minute with respect to 0.5 g of each specimen.

TABLE 4

|  | CO(75%)/ $H_2$(25%) (%) | $C_3H_6$ (%) | NO (%) | $CO_2$ (%) | $O_2$ (%) | $H_2O$ (%) | $N_2$ |
|---|---|---|---|---|---|---|---|
| RICH GAS | 1.78 | 0.16 | 0.12 | 10 | 0.65 | 5 | remainder |
| LEAN GAS | 0.70 | 0.16 | 0.12 | 10 | 1.40 | 5 | remainder |

Efficiency of converting HC, CO and $NO_x$ were measured about each catalyst continuously during rising of the temperature and 50% conversion temperature was thus obtained. As for the catalyst of Comparative Example 6, 50% conversion temperature was measured also in an initial state before the endurance test. The respective results are shown in FIG. 8.

Figure 8:
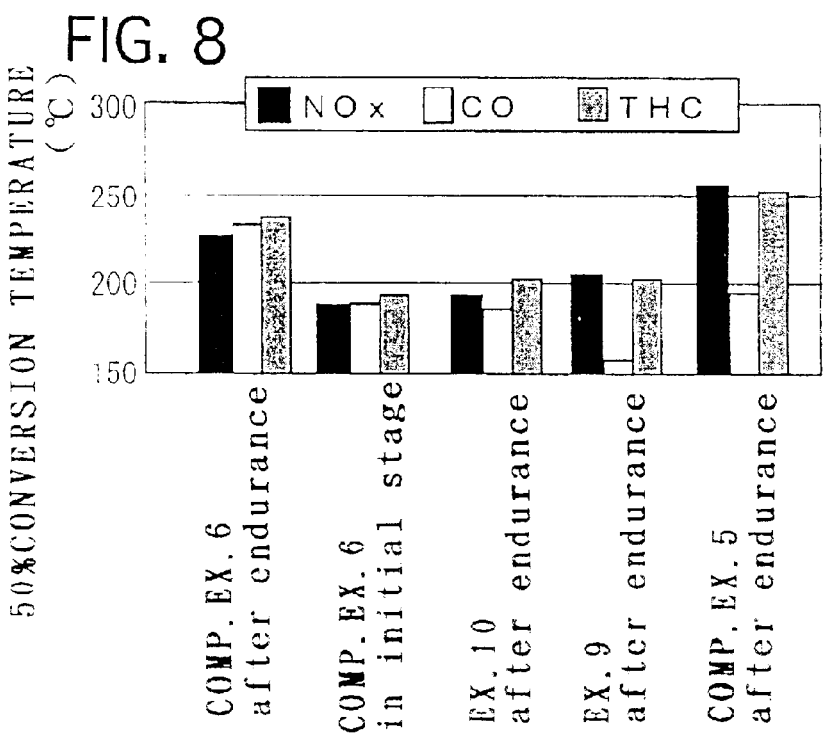
FIG. 8 is a graph showing 50% conversion temperature of the catalysts of the examples and the comparative examples.

It is clear from FIG. 8 that the catalysts of Examples 9 and 10 after the endurance test exhibited almost the same level of conversion efficiency as the initial state of Comparative Example 6, and accordingly were excellent in durability.

EXAMPLE 11

A predetermined amount of composite oxide powder of Example 1 was mixed with a predetermined amount of dinitrodiammine platinum nitrate solution. After the solution was evaporated and the residue was dried, the obtained powder was calcined at 500° C. for 2 hours, thereby preparing catalyst powder loaded with 1 wt % of Pt. This catalyst powder was compressed into pellets of 0.5 to 1 mm.

EXAMPLE 12

A predetermined amount of $ZrO_2$—$Y_2O_3$ solid solution powder at a molar ratio of Zr to Y=4/1 was mixed with a predetermined amount of dinitrodiammine platinum nitrate solution. After the solution was evaporated and the residue was dried, the obtained powder was calcined at 500° C. for 2 hours, thereby preparing catalyst powder loaded with 1 wt % of Pt. This catalyst powder was compressed into pellets of 0.5 to 1 mm.

EXAMPLE 13

A predetermined amount of $ZrO_2$—$Y_2O_3$ solid solution powder at a molar ratio of Zr to Y=7/2 was mixed with a predetermined amount of dinitrodiammine platinum nitrate solution. After the solution was evaporated and the residue was dried, the obtained powder was calcined at 500° C. for 2 hours, thereby preparing catalyst powder loaded with 1 wt % of Pt. This catalyst powder was compressed into pellets of 0.5 to 1 mm.

EXAMPLE 14

A predetermined amount of a mixture of 50 g of the composite oxide powder of Example 1 and 50 g of $ZrO_2$—$Y_2O_3$ solid solution powder at a molar ratio of Zr/Y=4/1 was mixed with a predetermined amount of dinitrodiaimine platinum nitrate solution. After the solution was evaporated and the residue was dried, the obtained powder was calcined at 500° C. for 2 hours, thereby preparing catalyst powder loaded with 1 wt % of Pt. This catalyst powder was compressed into pellets of 0.5 to 1 mm.

Comparative Example 7

A predetermined amount of γ—$Al_2O_3$ powder was mixed with a predetermined amount of dinitrodiammine platinum nitrate solution. After the solution was evaporated and the residue was dried, the obtained powder was calcined at 500° C. for 2 hours, thereby preparing catalyst powder loaded with 1 wt % of Pt. This catalyst powder was compressed into pellets of 0.5 to 1 mm.

<Experiment and Evaluation>

An endurance test was carried out about the respective catalysts of Examples 11 to 14 and Comparative Example 7 by holding the catalysts at 700° C. for 5 hours while introducing model gases shown in Table 5 alternately at a cycle of the rich gas for one minute and the lean gas for 4 minutes. The gas flow rate was 1 liter/minute with respect to 1 g of each specimen. Then the grain diameter of Pt loaded was measured by CO adsorption method and the results are shown in Table 6 in relative ratios to 100% of Pt dispersibility of the catalyst of Example 11.

TABLE 5

|  | CO (%) | $C_3H_6$ (ppmC) | $H_2$ (%) | $CO_2$ (%) | $O_2$ (%) | $N_2$ |
|---|---|---|---|---|---|---|
| RICH GAS | 1.0 | 2000 | 0.3 | 10 | 0.2 | remainder |
| LEAN GAS | 0.1 | — | 0.03 | 10 | 7.0 | remainder |

Figure 9:
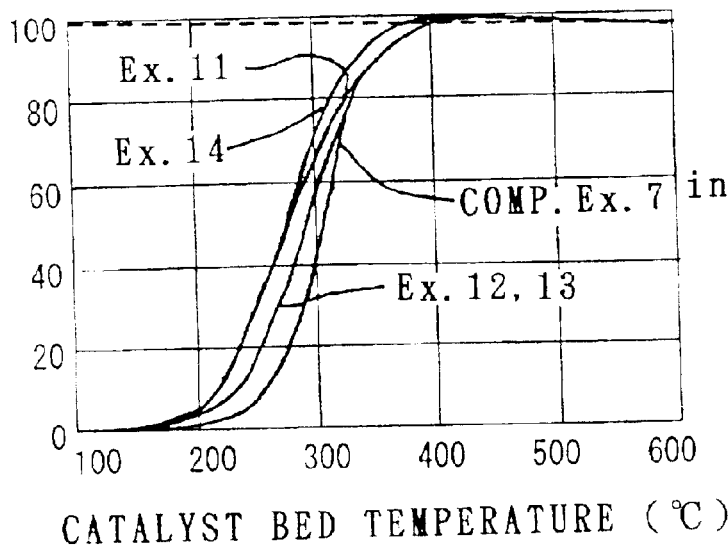
FIG. 9 is a graph showing initial CO conversion efficiency of catalysts of examples and a comparative example.
Figure 10:
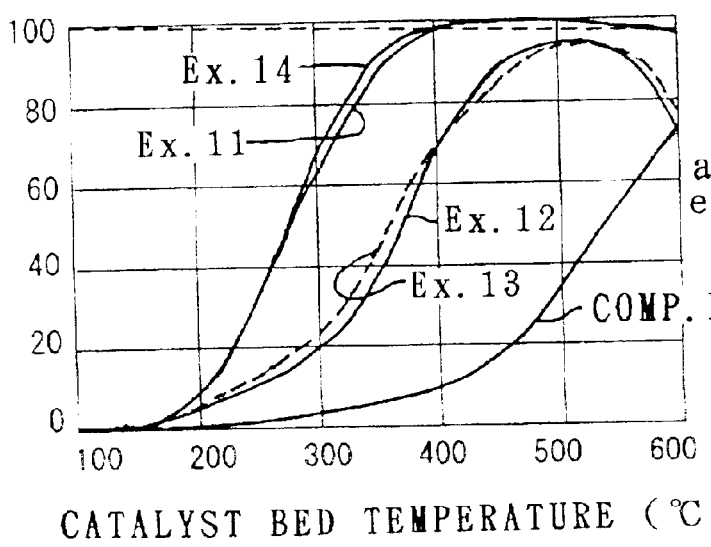
FIG. 10 is a graph showing CO conversion efficiency of the catalysts of the examples and the comparative example after an endurance test.

Each of the catalysts in the initial state and after the endurance test was placed in the normal-pressure fixed-bed gas-flow type catalyst evaluation apparatus, and pretreated at 500° C. for 15 minutes and then heated from 100° C. to 600° C. at a temperature rising rate of 15° C./minute, while a model gas composed of 1.8% CO, 10% $H_2O$ and the remainder of $N_2$ was introduced in a volume of 10 liters with respect to 2 g of each catalyst. During the rising of the temperature, CO conversion efficiency ($H_2$ generation efficiency) was measured continuously about each catalyst. The results are shown in FIGS. 9 and 10. Note that it is clear from another experiment that CO conversion efficiency is equal to $H_2$ generation efficiency. Dotted lines in these figures indicate calculated equilibrium values.

TABLE 6

|  | Pt DISPERSIBILITY (%) |
|---|---|
| EXAMPLE 11 | 100 |
| EXAMPLE 12 | 19.2 |
| EXAMPLE 13 | 22 |
| EXAMPLE 14 | 75 |
| COMP. EX. 7 | 4.6 |

It is apparent from FIGS. 9 and 10 that Examples 11 to 14 had superior $H_2$ generation capability to Comparative Example 7. Especially the catalysts of Examples 11 and 14 had remarkable advantages and maintained high $H_2$ generation capability even after the endurance test. It is admitted from Table 6 that Pt grain growth after the endurance test in Examples 11 to 14 was more suppressed than that of Comparative Example 7. Besides, although the catalyst of Example 14 had higher $H_2$ generation efficiency after the endurance test than that of Example 11, Pt grain growth of the catalyst of Example 11 after the endurance test was more suppressed than that of Example 14. The reason why the catalyst of Example 14 exhibited high $H_2$ generation efficiency is supposed to be the effect of adding $ZrO_2$—$Y_2O_3$ solid solution.

EXAMPLE 15

A predetermined amount of the composite oxide powder prepared in Example 1 was mixed with a predetermined amount of dinitrodiammine platinum nitrate solution having a predetermined concentration. After the solution was vaporized and the residue was dried, the obtained powder was calcined at 500° C. for 2 hours, thereby preparing catalyst powder of this example. The amount of Pt loaded was 1.67 wt %. This catalyst powder was compressed into pellets, thereby preparing pellet catalyst of this example. The catalyst support of this pellet catalyst is composed of about 89 wt % $CeO_2$ and about 11 wt % $Al_2O_3$.

EXAMPLE 16

0.29 mol (104 g) of aluminum nitrate 9-hydrate was mixed with 2000 ml of ion exchange water and dissolved by stirring with a propeller mixer for 5 minutes. Then 254 g (0.41 mol equivalent in terms of $CeO_2$) of aqueous cerium nitrate solution having a concentration of 28 wt % was mixed to the solution and stirred for another 5 minutes.

177 g of 25% aqueous ammonia was added to the obtained mixed solution and stirred for another 10 minutes, thereby preparing an aqueous solution containing precipitate. An aging step was carried out by heating the solution containing the precipitate at 120° C. for 2 hours under a pressure of 2 atm, thereby aging the precipitate.

Then the solution containing the aged precipitate was heated at a temperature rising rate of 100° C./hour and calcined at 400° C. for 5 hours, thereby preparing $CeO_2$—$Al_2O_3$ composite oxide powder. The obtained composite oxide powder is composed of about 83 wt % $CeO_2$ and about 17 wt % $Al_2O_3$.

Pellet catalyst was prepared by loading Pt on this composite oxide powder in a similar way to Example 15.

EXAMPLE 17

Composite oxide powder containing a mixture in which the $CeO_2$—$Al_2O_3$ composite oxide particles and the $Al_2O_3$ particles were dispersed at the level of not more than 50 nm by 90% or more of the total weight of the composite oxide powder was prepared in a similar way to Example 16, except that the amounts of aluminum nitrate 9-hydrate and cerium nitrate were changed. Also pellet catalyst was prepared by loading Pt on this composite oxide powder in a similar way to Example 16. The catalyst support of this pellet catalyst is composed of about 75 wt % $CeO_2$ and about 25 wt % $Al_2O_3$.

EXAMPLE 18

Composite oxide powder containing a mixture in which the $CeO_2$—$Al_2O_3$ composite oxide particles and the $Al_2O_3$ particles were dispersed at the level of not more than 50 nm by 90% or more of the total weight of the composite oxide powder was prepared in a similar way to Example 16, except that the amounts of aluminum nitrate 9-hydrate and cerium nitrate were changed. Also pellet catalyst was prepared by loading Pt on this composite oxide powder in a similar way to Example 16. The catalyst support of this pellet catalyst is composed of about 60 wt % $CeO_2$ and about 40 wt % $Al_2O_3$.

EXAMPLE 19

Composite oxide powder containing a mixture in which the $CeO_2$—$Al_2O_3$ composite oxide particles and the $Al_2O_3$ particles were dispersed at the level of not more than 50 nm by 90% or more of the total weight of the composite oxide powder was prepared in a similar way to Example 16, except that the amounts of aluminum nitrate 9-hydrate and cerium nitrate were changed. Also pellet catalyst was prepared by loading Pt on this composite oxide powder in a similar way to Example 16. The catalyst support of this pellet catalyst is composed of about 50 wt % $CeO_2$ and about 50 wt % $Al_2O_3$.

EXAMPLE 20

Composite oxide powder containing a mixture in which the $CeO_2$—$Al_2O_3$ composite oxide particles and the $Al_2O_3$ particles were dispersed at the level of not more than 50 nm by 90% or more of the total weight of the composite oxide powder was prepared in a similar way to Example 16, except that the amounts of aluminum nitrate 9-hydrate and cerium nitrate were changed. Also pellet catalyst was prepared by loading Pt on this composite oxide powder in a similar way to Example 16. The catalyst support of this pellet catalyst is composed of about 40 wt % $CeO_2$ and about 60 wt % $Al_2O_2$.

EXAMPLE 21

Composite oxide powder was prepared in a similar way to Example 17, except that magnesium nitrate was further added to the mixed aqueous solution of aluminum nitrate 9-hydrate and cerium nitrate. Also pellet catalyst was prepared by loading Pt on this composite oxide powder in a similar way to Example 17. The catalyst support of this pellet catalyst is composed of about 75 wt % $CeO_2$, about 25 wt % $Al_2O_3$ and 5 mol % MgO.

EXAMPLE 22

Composite oxide powder was prepared in a similar way to Example 17, except that zirconium nitrate was further added to the mixed aqueous solution of aluminum nitrate 9-hydrate and cerium nitrate. Also pellet catalyst was prepared by loading Pt on this composite oxide powder in a similar way to Example 17. The catalyst support of this pellet catalyst is composed of about 75 wt % $CeO_2$, about 25 wt % $Al_2O_3$ and 5 mol % $ZrO_2$.

<Experiment and Evaluation>

A fuel-rich and fuel-lean endurance test was carried out about the respective catalysts of Examples 15 to 22 by holding the catalysts at 900° C. for 5 hours while introducing model gases shown in Table 5 alternately at a cycle of the fuel-rich gas for one minute and the fuel-lean gas for four minutes. The gas flow rate was 1 liter/minute with respect to 1 g of each sample.

In addition to the above fuel-rich and fuel-lean endurance test, an endurance test in the air was carried out about the respective catalysts by applying reduction treatment at 500° C. in a nitrogen atmosphere containing 5% $H_2$ and then holding the catalysts at 900° C. in the air for 5 hours.

Each of the catalysts after the above two endurance tests was placed in the evaluation apparatus and heated at a temperature rising rate of 12° C./minute from room temperature to 400° C. while introducing a model gas shown in Table 7. The gas flow rate was 3500 cc/minute with respect to 1 g of each catalyst.

TABLE 7

| CO (%) | $H_2$ (%) | $CO_2$ (% | $O_2$ (%) | NO (%) | $C_3H_6$ (%) | $H_2O$ (%) | $N_2$ |
|---|---|---|---|---|---|---|---|
| 0.525 | 0.1.75 | 10 | 0.646 | 0.12 | 0.16 | 5 | remainder |

Efficiency of converting HC, CO and $NO_x$ during the rising of the temperature was continuously measured about each catalyst and 50 % conversion temperature of each catalyst was thus obtained. The results are shown in FIGS. 11 and 12.

Figure 11:
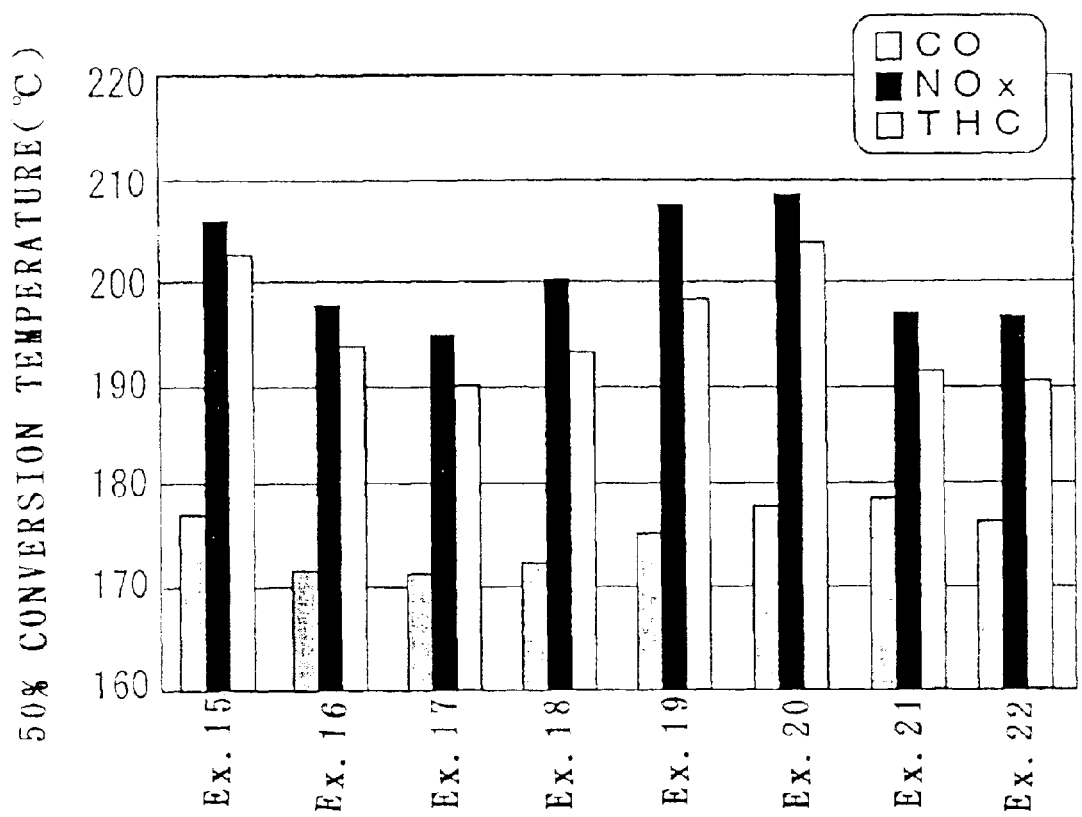
FIG. 11 is a graph showing 50% conversion temperature of the catalysts of the examples after a fuel-rich and fuel-lean endurance test.
Figure 12:
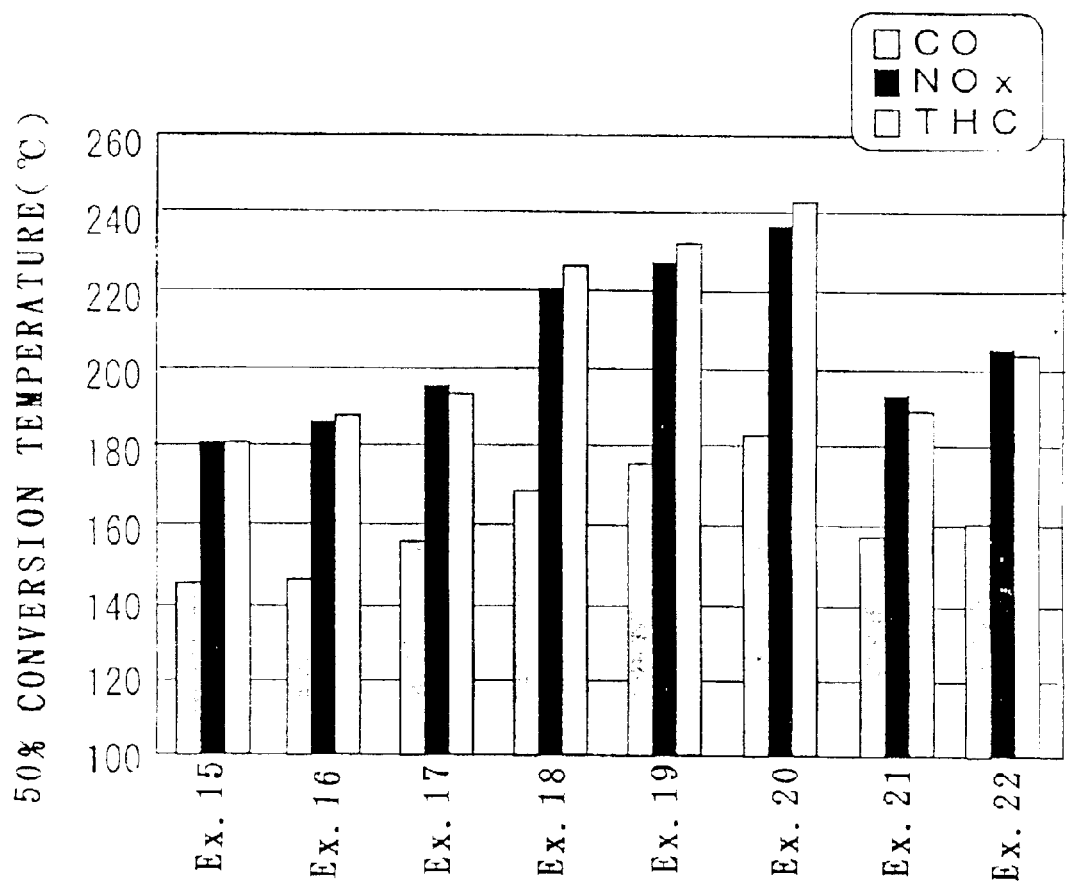
FIG. 12 is a graph showing 50% conversion temperature of the catalysts of the examples after an endurance test in the air.

It is admitted from FIGS. 11 and 12 that catalytic activity differed in accordance with the amount of $Al_2O_3$ and that the weight ratio of $CeO_2$:$Al_2O_3$=about 75:25 is particularly preferable after the fuel-rich and fuel-lean endurance test. It is also clear that the above effect is not damaged even if Mg or Zr is composited as a metal $M_3$.

Comparative Example 8

Catalyst powder was prepared in a similar way to comparative Example 7, except that the amount of Pt loaded on the predetermined amount of γ—$Al_2O_3$ powder was 2 wt %. This catalyst powder was compressed into pellets of 0.5 to 1 mm.

Comparative Example 9

Catalyst powder was prepared by loading 2 wt % of Pt on a predetermined amount of the oxide powder of comparative Example 1 in a similar way to Comparative Example 8. This catalyst powder was compressed into pellets of 0.5 to 1 mm.

EXAMPLE 23

Catalyst powder was prepared by loading 2 wt % of Pt on a predetermined amount of the composite oxide powder prepared in Example 1 in a similar way to Comparative Example 8. This catalyst powder was compressed into pellets of 0.5 to 1 mm.

<Experiment and Evaluation>

Catalyst activity in each step was evaluated about the respective catalysts of Example 23 and Comparative Examples 8 and 9 by applying the following treatment:

---

Evaluation Step 1
↓
An endurance test by introducing model gases alternately at a cycle of the fuel-lean gas for 4 minutes and the fuel-rich gas for 1 minute at 700° C. for 25 hours
↓
Evaluation Step 2
Heat treatment at 800° C. in the air for 5 hours
↓
Evaluation Step 3
↓
An endurance test introducing the model gases alternately at a cycle of the fuel-lean gas for 4 minutes and the fuel-rich gas for 1 minute at 700° C. for 25 hours
↓
Evaluation Step 4
↓
Heat treatment at 800° C. in the air for 5 hours
↓
Evaluation Step 5

---

The composition of the model gases used at a cycle of the fuel-lean gas for 4 minutes and the fuel-rich gas for one minute in the endurance test at 700° C. is shown in Table 8. At the time of evaluation, the respective catalyst specimens were subjected to pretreatment at 500° C. in the stoichiometric gas for 10 minutes. Then, while the composition of the stoichiometric gas was kept static, the temperature was increased at 12° C./minute from 100° C. to 400° C. and measuring 50% conversion temperatures about HC, CO and $NO_x$. Catalytic activity was thus evaluated. The results are shown in FIGS. 13 to 15.

TABLE 8

| | CO (%) | $H_2$ (%) | $C_3H_6$ (%) | NO (%) | $O_2$ (%) | $CO_2$ (%) | $H_2O$ (%) | N | TIME |
|---|---|---|---|---|---|---|---|---|---|
| FUEL-RICH GAS | 0.66 | 0.22 | 0.07 | 0.16 | 0.18 | 8.8 | 3 | remainder | 1 |
| FUEL-LEAN GAS | 0.06 | 0.02 | 0.07 | 0.15 | 6.64 | 8.3 | 3 | remainder | 4 |

Figure 13:
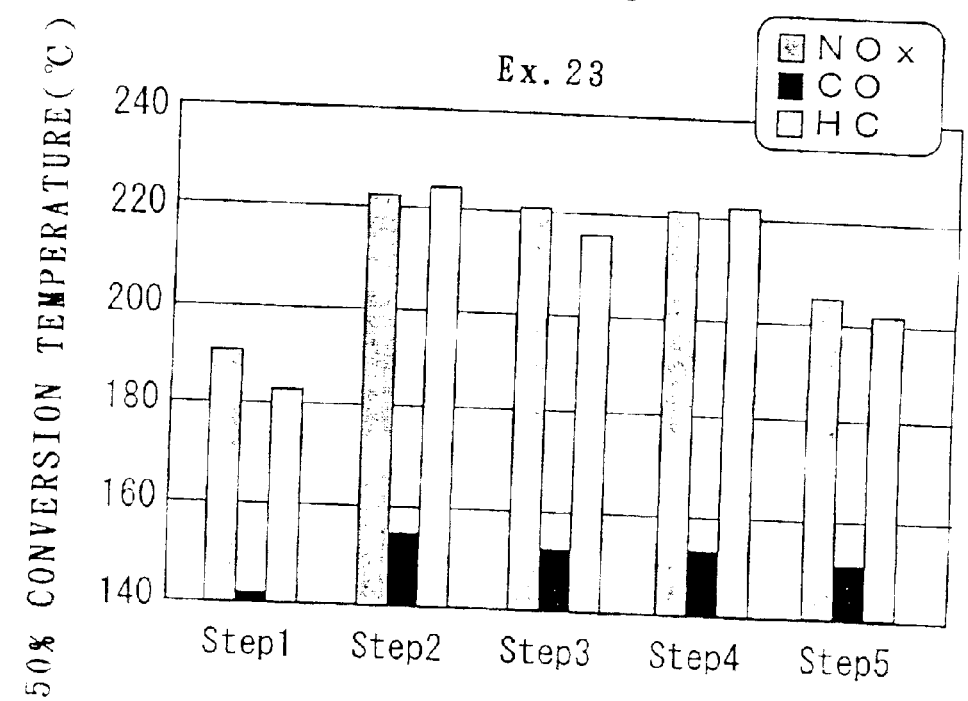
FIG. 13 is a graph showing 50% conversion temperature of the catalyst of Example 23 in each evaluation step.
Figure 14:
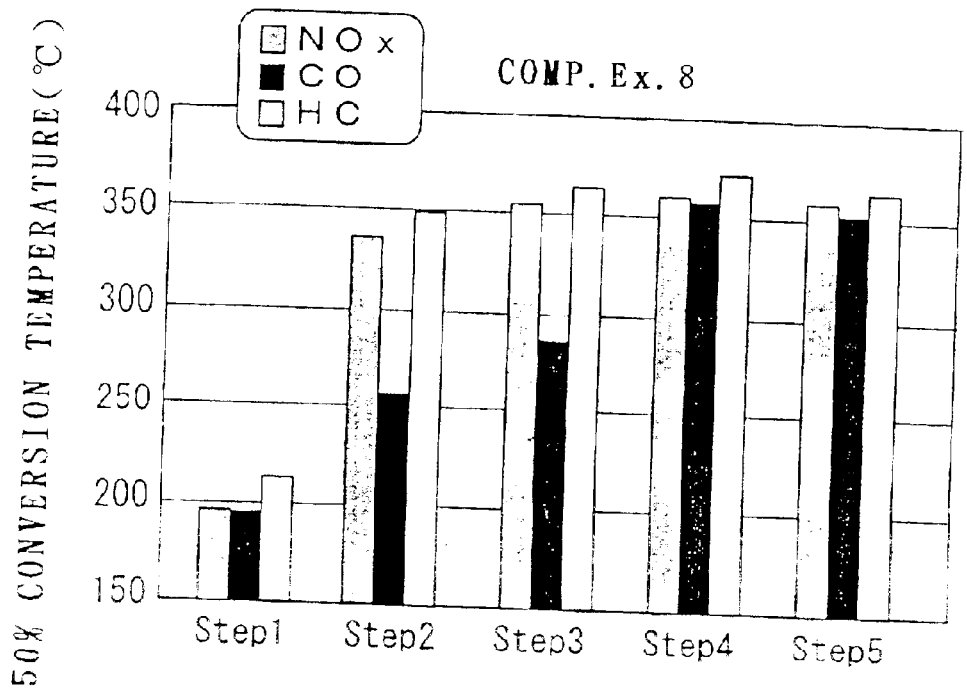
FIG. 14 is a graph showing 50% conversion temperature of the catalyst of Comparative Example 8 in each evaluation step.
Figure 15:
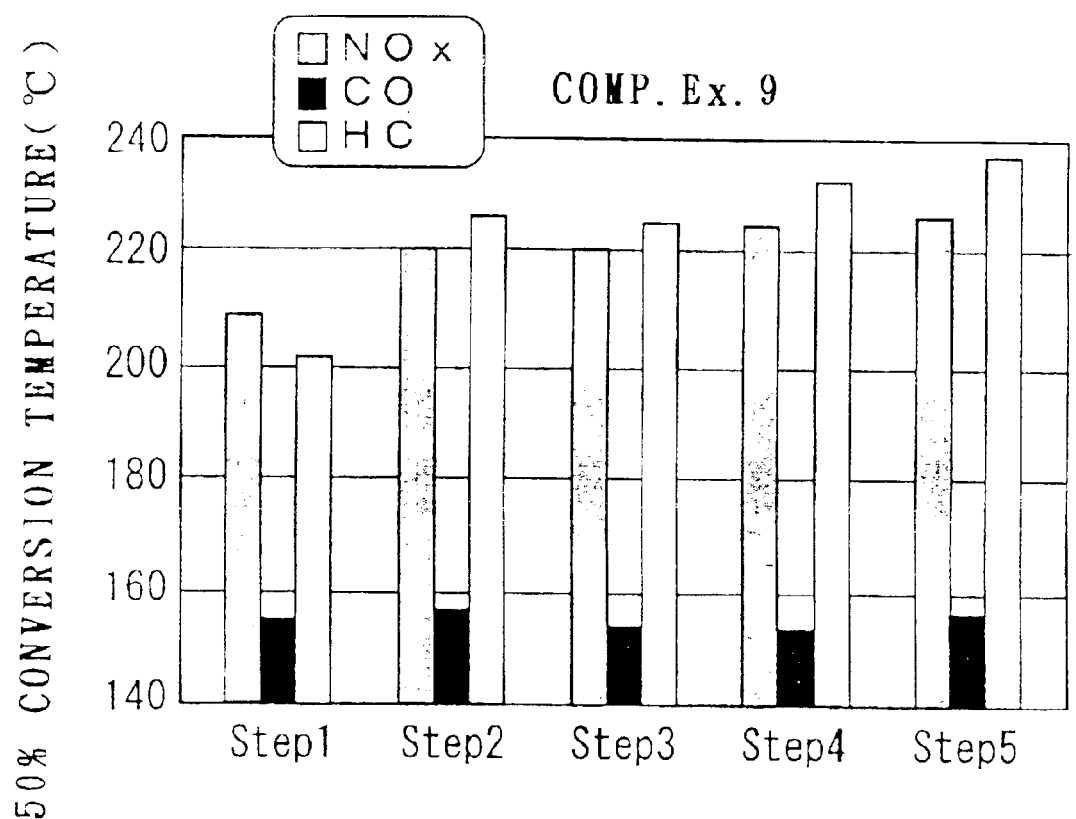
FIG. 15 is a graph showing 50% conversion temperature of the catalyst of Comparative Example 9 in each evaluation step.

As apparent from FIGS. 13 to 15, the catalytic activity of the catalyst of Example 23 was recovered by the heat treatment at 800° C. in the air for 5 hours. However, the catalytic activity of the catalysts of Comparative Examples 8 and 9 were not recovered. Namely, it was turned out that the heat treatment at 800° C. in the air, which was severer endurance conditions for ordinary catalysts, became an operation for recovering catalytic activity for the catalyst of Example 23. This operation does not require any special chemical application to the catalyst in itself but can be carried out only by controlling the atmosphere. This result demonstrates that the catalyst employing the composite oxide of the present invention as a catalyst support is extremely suitable for the use as a catalyst for purifying exhaust gases from automobile engines which requires durability.

It is to be noted that these experimental conditions were selected to show clearly the function of recovering catalytic activity of the catalyst of the present invention self-sustainingly. If this recovering operation is carried out by controlling an exhaust gases atmosphere from an engine at a short cycle such as in minute units or second units, it is possible to construct a catalyst system in which catalytic activity substantially never deteriorates.

EXAMPLE 24

0.2 mol (75.1 g) of aluminum nitrate 9-hydrate was mixed with 500 ml of ion exchange water and dissolved by stirring with a propeller mixer for 5 minutes. Then 304 g (0.5 mol equivalent in terms of $CeO_2$) of aqueous cerium nitrate solution having a concentration of 28 wt % was added to the mixed solution and stirred for another 5 minutes.

177 g of 25% aqueous ammonia was added to the obtained mixed solution and stirred for another 10 minutes, thereby preparing an aqueous solution containing precipitate. Then an aging step was carried out by applying heat treatment at 120° C. for 2 hours under a pressure of 2 atm, thereby aging the precipitate. Then the solution containing the aged precipitate was filtered with a suction filter, thereby obtaining a filter cake.

This filter cake was dispersed again in 500 ml of ion exchange water by a propeller mixer, and 9.1 g of alkylamine-based cationic surfactant 'ARMAC T-50' produced by LION Corporation was further added. Then the mixed solution was stirred at 10,000 rpm for 5 minutes by a homogenizer with a rotor diameter of 17 mm and a gap of 1 mm.

Next, this suspension was filtered with a suction filter and the obtained filter cake was calcined at 400° C. for 5 hours, thereby preparing $CeO_2$—$Al_2O_3$ composite oxide powder. The obtained composite oxide powder had the same composition as that of Example 1.

The pore volume of the composite oxide powder of Example 24, as well as those of Examples 1, 4, 6 and Comparative Examples 1 to 3 was measured by using a mercury porosimeter. The total volume of pores of 3.5 to 100 nm was respectively 0.34, 0.30, 0.21 cc/g after treatments at 600° C., 800° C., 1000° C. for 5 hours. It is apparent that a larger pore volume than that of Example 1 can be secured by employing filtration treatment and surfactant treatment in combination.

Obviously, many modifications and variations of the present invention are possible in the light of the above teachings. It is therefore to be understood that within the scope of the appended claims, the invention may be practiced otherwise than as specifically described.

What is claimed is:

1. A composite oxide powder, consisting essentially of:
   a mixture of particles of an oxide of metal $M_1$ which is cerium and an oxide of a metal $M_2$ which is at least one element selected from the group consisting of aluminum, titanium and silicon and which does not dissolve in said oxide of metal $M_1$, wherein the cerium oxide constitutes more than 50% by wt of the composite oxide powder said mixture having been calcined at 600° C. for 5 hours or at 800° C. for 5 hours, and wherein the calcination of said mixture when calcined at 600° C for 5 hours results in a composite oxide powder having a porosity such that pores in the size range of 3.5 to 100 nm in diameter have a volume of 0.13 cc/g or more and when calcined at 800° C. for 5 hours results in a composite oxide powder having a porosity such that the pores in the size range of 3.5 to 100 nm in diameter have a volume of 0.10 cc/g or more.

2. The composite oxide powder according to claim 1, wherein when microanalysis of one of said composite oxide particles not overlapped is conducted by means of energy dispersive X-ray spectrometry (EDS) using a field emission scanning transmission electron microscope (FE-STEM) with a beam of 5 nm diameter, said metal $M_1$ and said metal $M_2$ are detected at a composition in ±20% of charge composition at 90% or more of respective analytical points.

3. The composite oxide powder according to claim 1, wherein when microanalysis of one of said composite oxide particles not overlapped is conducted by means of energy dispersive X-ray spectrometry (EDS) using a field emission scanning transmission electron microscope (FE-STEM) with a beam of 0.5 nm diameter, said metal $M_1$ and said metal $M_2$ are detected at a composition in ±20% of charge composition at 90% or more of respective analytical points.

4. The composite oxide powder according to claim 1, wherein the mixture of particles of the composite oxide in which particles of said oxide of said metal $M_2$ are dispersed is such that particles of the mixture of a size of not more than 50 nm constitute 90% or more of the total weight of said composite oxide powder.

5. The composite oxide powder according to claim 1, wherein said metal $M_2$ is Al.

6. The composite oxide powder according to claim 1, wherein said oxide of metal $M_1$ is present in an amount of 75% or more of the total weight of said composite oxide powder.

7. The composite oxide powder according to claim 1, wherein cerium oxide after calcination at 600° C. for 5 hours has a crystallite diameter of 5 to 10 nm which is calculated from a half width of an X-ray diffraction peak of $CeO_2$ (200).

8. The composite oxide powder according to claim 1, wherein cerium oxide after calcination at 800° C. for 5 hours has a crystallite diameter of 10 to 20 nm, which is calculated from a half width of an X-ray diffraction peak of $CeO_2$ (220).

9. The composite oxide powder according to claim 1, wherein cerium oxide after calcination at 1000° C. for 5 hours has a crystallite diameter of 35 nm or more, which is calculated from a half width of an X-ray diffraction peak of $CeO_2$ (220).

10. A catalyst, comprising:
a catalyst support which comprises said composite oxide powder recited in claim 1, and
a noble metal loaded on said catalyst support.

11. A catalyst, comprising:
a catalyst support which comprises said composite oxide powder recited in claim 1, and a solid solution or composite oxide of zirconia and yttria; and
a noble metal loaded on said catalyst support.

12. The catalyst according to claim 10, wherein said noble metal comprises at least Pt.

13. The catalyst according to claim 11, wherein said noble metal comprises at least Pt.

14. The catalyst according to claim 11, wherein the compositional ratio by weight of said solid solution or said composite oxide of zirconia and yttria to said composite oxide powder is 0 to 100-100 to 0 exclusive.

15. The catalyst according to claim 11, wherein the molar ratio of said zirconia and said yttria is $1 \leq Zr/Y \leq 4.5$ in terms of metal elements.

16. A composite oxide powder, consisting essentially of:
a mixture of particles of an oxide of metal $M_1$ which is cerium and an oxide of a metal $M_2$ which is at least one element selected from the group consisting of aluminum, titanium and silicon and which does not dissolve in said oxide of metal $M_1$, and an oxide of a metal $M_3$ which dissolves in at least one member selected from the group consisting of said oxide of metal $M_1$ and said oxide of metal $M_2$, wherein the cerium oxide constitutes more than 50% by wt of the composite oxide powder, said mixture having been calcined at 600° C. for 5 hours or at 800° C. for 5 hours, and wherein the calcination of said mixture when calcined at 600° C. for 5 hours results in a composite oxide powder having a porosity such that pores in the size range of 3.5 to 100 nm in diameter have a volume of 0.13 cc/g or more and when calcined at 800° C. for 5 hours results in a composite oxide powder having a porosity such that the pores in the size range of 3.5 to 100 nm in diameter have a volume of 0.10 cc/g or more.

17. The composite oxide powder according to claim 16, wherein said metal $M_3$ is at least one element selected from the group consisting of Zr, alkaline earth metals and rare earth metals.

18. A composite oxide powder, consisting essentially of:
a mixture of particles of an oxide of metal $M_1$ which is cerium and an oxide of a metal $M_2$ which is at least one element selected from the group consisting of aluminum, titanium and silicon and which does not dissolve in said oxide of metal $M_1$, wherein the cerium oxide, constitutes more than 60% by wt of the composite oxide powder said mixture having been calcined at 600° C. for 5 hours or at 800° C. for 5 hours, and wherein the calcination of the composite said mixture when calcined at 600° C. for 5 hours results in a composite oxide powder having a porosity such that pores in the size range of 3.5 to 100 nm in diameter have a volume of 0.13 cc/g or more and when calcined at 800° C. for 5 hours results in a composite oxide powder having a porosity such that the pores in the size range of 3.5 to 100 nm in diameter have a volume of 0.10 cc/g or more.

19. A composite oxide powder, consisting essentially of:
a mixture of particles of an oxide of metal $M_1$ which is a cerium and an oxide of a metal $M_2$ which is at least one element selected from the group consisting of aluminum, titanium and silicon and which does not dissolve in said oxide of metal $M_1$, wherein the cerium oxide constitutes more than 50% by wt of the composite oxide powder, and wherein said composite oxide powder when calcined at 600° C. for 5 hours has a porosity such that pores in the size range of 3.5 to 100 nm in diameter have a volume of 0.13 cc/g or more and when calcined at 800° C. for 5 hours has a porosity such that the pores in the size range of 3.5 to 100 nm in diameter have a volume of 0.10 cc/g or more; said composite oxide powder having been prepared by the steps of:
preparing an aqueous solution or water-containing solution of a chemical compound of said metal $M_1$ and a chemical compound of said metal $M_2$, an oxide of which does not dissolve in said oxide of metal $M_1$;
precipitating said oxide of said metal $M_1$ or a precursor of said oxide of said metal $M_1$ and said oxide of said metal $M_2$ or a precursor of said oxide of said metal $M_2$ or a chemical compound of said oxides or said precursors from said solution;
aging said precipitate in a suspended state in which water or a water-containing solution is a dispersion medium or in a state in which there is abundant water in a closed system consisting of said precipitate, steam and water; and then calcining said precipitate.

20. A composite oxide powder, consisting essentially of:
a mixture of particles of an oxide of metal $M_1$ which is cerium and an oxide of a metal $M_2$ which is at least one element selected from the group consisting of aluminum, titanium and silicon and which does not dissolve in said oxide of metal $M_1$, wherein the cerium oxide constitutes more than 60% by wt of the composite oxide powder, and wherein said composite oxide powder when calcined at 600° C. for 5 hours has a porosity such that pores in the size range of 3.5 to 100 nm in diameter have a volume of 0.13 cc/g or more and when calcined at 800° C. for 5 hours has a porosity such that the pores in the size range of 3.5 to 100 nm in a diameter have a volume of 0.10 cc/g or more; said composite oxide powder having been prepared by the steps of:

preparing an aqueous solution or water-containing solution of a chemical compound of said metal $M_1$ and a chemical compound of said metal $M_2$, an oxide of which does not dissolve in said oxide of metal $M_1$;

precipitating said oxide of said metal $M_1$ or a precursor of said oxide of metal $M_1$ and said oxide of said metal $M_2$ or a precursor of said oxide of said metal $M_2$ or a chemical compound of said oxides or said precursors from said solution;

aging said precipitate in a suspended state in which water or a water-containing solution is a dispersion medium or in a state in which there is abundant water in a closed system consisting of said precipitate, steam and water; and then calcining said precipitate.

21. A composite oxide powder, consisting essentially of:

a mixture of particles of an oxide of metal $M_1$ which is cerium and an oxide of a metal $M_2$ which is at least one element selected from the group consisting of aluminum, titanium and silicon and which does not dissolve in said oxide of metal $M_1$, and an oxide of a metal $M_3$ which dissolves in at least one member selected from the group consisting of said oxide of metal $M_2$, wherein the cerium oxide constitutes more than 50% by wt of the composite oxide powder, and wherein said composite oxide powder, and wherein said composite oxide powder, and wherein said composite oxide powder when calcined at 600° C. for 5 hours has a porosity such that pores in the size range of 3.5 to 100 nm in diameter have a volume of 0.13 cc/g or more when calcined at 800° C for 5 hours has a porosity such that pores in the size range of 3.5 to 100 nm in diameter have a volume of 0.10 cc/g or more; said composite oxide powder having been prepared by the steps of:

preparing an aqueous solution or water-containing solution of a chemical compound of said metal $M_1$, a chemical compound of a said metal $M_2$, an oxide of which does not dissolve in said oxide of metal $M_1$, and a chemical compound of said metal $M_3$, an oxide of which can dissolve in at least one of said oxide of metal $M_1$ and said oxide of metal $M_2$;

precipitating said oxide of said metal $M_1$ or a precursor of said oxide of metal $M_1$, said oxide of said metal $M_2$ or a precursor of said oxide of said metal $M_2$, and said oxide of metal $M_3$ or a precursor of the oxide of metal $M_3$, or a chemcial compound of said oxides or said precursors from said solution;

aging said precipitate in a suspended state in which water or a water-containing solution is a dispersion medium or in a state in which there is abundant water in a closed system consisting of said precipitite, steam and water; and then calcining said precipitate.

* * * * *

UNITED STATES PATENT AND TRADEMARK OFFICE
CERTIFICATE OF CORRECTION

PATENT NO. : 6,933,259 B2
DATED : August 23, 2005
INVENTOR(S) : Miho Hatanaka et al.

It is certified that error appears in the above-identified patent and that said Letters Patent is hereby corrected as shown below:

Column 25,
Line 30, "(200)" should read -- (220) --.

Signed and Sealed this

Seventh Day of March, 2006

JON W. DUDAS
*Director of the United States Patent and Trademark Office*